US010909183B2

(12) United States Patent
Wright et al.

(10) Patent No.: US 10,909,183 B2
(45) **Date of Patent: *Feb. 2, 2021**

(54) COMPUTER DATA SYSTEM DATA SOURCE REFRESHING USING AN UPDATE PROPAGATION GRAPH HAVING A MERGED JOIN LISTENER

(71) Applicant: Deephaven Data Labs LLC, Plymouth, MN (US)

(72) Inventors: Charles Wright, Cortlandt Manor, NY (US); Ryan Caudy, New York, NY (US); David R. Kent, IV, Colorado Springs, CO (US); Mark Zeldis, Randolph, NJ (US); Raffi Basralian, New York, NY (US); Radu Teodorescu, New York, NY (US)

(73) Assignee: Deephaven Data Labs LLC, Plymouth, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/215,543

(22) Filed: Dec. 10, 2018

(65) Prior Publication Data

US 2019/0108167 A1 Apr. 11, 2019

Related U.S. Application Data

(63) Continuation of application No. 15/813,112, filed on Nov. 14, 2017, now Pat. No. 10,198,469.

(Continued)

(51) Int. Cl.

*G06F 16/00* (2019.01)
*G06F 16/903* (2019.01)

(Continued)

(52) U.S. Cl.

CPC ...... *G06F 16/90335* (2019.01); *G06F 3/0481* (2013.01); *G06F 16/128* (2019.01);

(Continued)

(58) Field of Classification Search

CPC .... G06F 16/221; G06F 16/23; G06F 16/2358; G06F 16/2365; G06F 16/2372;

(Continued)

(56) References Cited

U.S. PATENT DOCUMENTS

| | | | | |
|---|---|---|---|---|
| 5,335,202 | A | 8/1994 | Manning et al. | |
| 5,452,434 | A * | 9/1995 | MacDonald | G06F 1/3237 713/601 |

(Continued)

FOREIGN PATENT DOCUMENTS

| | | | |
|---|---|---|---|
| CA | 2309462 | A1 | 12/2000 |
| EP | 1406463 | A2 | 4/2004 |

(Continued)

OTHER PUBLICATIONS

Final Office Action dated May 4, 2017, in U.S. Appl. No. 15/155,009.

(Continued)

*Primary Examiner* — Shyue Jiunn Hwa
(74) *Attorney, Agent, or Firm* — Carmichael IP, PLLC

(57) ABSTRACT

Described are methods, systems and computer readable media for data source refreshing using an update propagation graph having a merged join listener.

27 Claims, 10 Drawing Sheets

Related U.S. Application Data

(60) Provisional application No. 62/549,908, filed on Aug. 24, 2017.

(51) Int. Cl.

| | |
|---|---|
| ***G06F 16/23*** | (2019.01) |
| ***G06F 16/901*** | (2019.01) |
| ***G06F 16/9038*** | (2019.01) |
| ***G06F 16/904*** | (2019.01) |
| ***G06F 16/532*** | (2019.01) |
| ***G06T 11/20*** | (2006.01) |
| ***G06F 16/21*** | (2019.01) |
| ***G06F 16/28*** | (2019.01) |
| ***G06F 16/22*** | (2019.01) |
| ***G06F 3/0481*** | (2013.01) |
| ***G06F 16/11*** | (2019.01) |
| *G06F 16/48* | (2019.01) |
| *G06F 12/02* | (2006.01) |

(52) U.S. Cl.

CPC ............ *G06F 16/21* (2019.01); *G06F 16/221* (2019.01); *G06F 16/23* (2019.01); *G06F 16/235* (2019.01); *G06F 16/2358* (2019.01); *G06F 16/2365* (2019.01); *G06F 16/2372* (2019.01); *G06F 16/289* (2019.01); *G06F 16/532* (2019.01); *G06F 16/901* (2019.01); *G06F 16/904* (2019.01); *G06F 16/9024* (2019.01); *G06F 16/9038* (2019.01); *G06T 11/206* (2013.01); *G06F 12/0253* (2013.01); *G06F 16/489* (2019.01)

(58) Field of Classification Search

CPC ............... G06F 16/9024; G06F 3/0481; G06F 11/1451; G06F 11/1464; G06F 11/1469; G06F 12/0261; G06F 12/084; G06F 12/1483; G06F 15/17331; G06F 16/113; G06F 16/144; G06F 16/162; G06F 16/215; G06F 16/22; G06F 16/2228; G06F 16/2237; G06F 16/2246; G06F 16/2255; G06F 16/2264; G06F 16/2272; G06F 16/2282; G06F 16/2291; G06F 16/2308; G06F 16/2379; G06F 16/248; G06F 16/254; G06F 16/27; G06F 16/278; G06F 16/285; G06F 16/907; G06F 16/951; G06F 16/9535; G06F 16/9566; G06F 16/9574; G06F 17/40; G06F 21/00; G06F 21/6209; G06F 2201/805; G06F 2201/84; G06F 2212/1052; G06F 2212/152; G06F 2212/163; G06F 2212/60; G06F 3/0482; G06F 16/245; G06F 16/242; G06F 16/235; G06F 16/2393

See application file for complete search history.

(56) References Cited

U.S. PATENT DOCUMENTS 5,469,567 A 11/1995 Okada
5,504,885 A 4/1996 Alashqur
5,530,939 A 6/1996 Mansfield et al.
5,568,632 A 10/1996 Nelson
5,673,369 A 9/1997 Kim
5,701,461 A 12/1997 Dalal et al.
5,701,467 A 12/1997 Freeston
5,764,953 A 6/1998 Collins et al.
5,787,411 A 7/1998 Groff et al.
5,787,428 A 7/1998 Hart
5,806,059 A 9/1998 Tsuchida et al.
5,808,911 A 9/1998 Tucker et al.
5,859,972 A 1/1999 Subramaniam et al.
5,873,075 A * 2/1999 Cochrane .......... G06F 16/24565
5,875,334 A 2/1999 Chow et al.
5,878,415 A 3/1999 Olds
5,890,167 A 3/1999 Bridge et al.
5,899,990 A 5/1999 Maritzen et al.
5,920,860 A 7/1999 Maheshwari et al.
5,943,672 A 8/1999 Yoshida
5,960,087 A 9/1999 Tribble et al.
5,991,810 A 11/1999 Shapiro et al.
5,999,918 A 12/1999 Williams et al.
6,006,220 A 12/1999 Haderle et al.
6,026,390 A 2/2000 Ross et al.
6,032,144 A 2/2000 Srivastava et al.
6,032,148 A 2/2000 Wilkes
6,038,563 A 3/2000 Bapat et al.
6,058,394 A 5/2000 Bakow et al.
6,061,684 A 5/2000 Glasser et al.
6,138,112 A 10/2000 Slutz
6,160,548 A 12/2000 Lea et al.
6,253,195 B1 6/2001 Hudis et al.
6,266,669 B1 7/2001 Brodersen et al.
6,289,357 B1 9/2001 Parker
6,292,803 B1 9/2001 Richardson et al.
6,304,876 B1 10/2001 Isip
6,317,728 B1 11/2001 Kane
6,327,702 B1 12/2001 Sauntry et al.
6,336,114 B1 1/2002 Garrison
6,353,819 B1 3/2002 Edwards et al.
6,367,068 B1 4/2002 Vaidyanathan et al.
6,389,414 B1 5/2002 Delo et al.
6,389,462 B1 5/2002 Cohen et al.
6,397,206 B1 5/2002 Hill et al.
6,438,537 B1 8/2002 Netz et al.
6,446,069 B1 9/2002 Yaung et al.
6,460,037 B1 10/2002 Weiss et al.
6,473,750 B1 10/2002 Petculescu et al.
6,487,552 B1 11/2002 Lei et al.
6,496,833 B1 12/2002 Goldberg et al.
6,505,189 B1 1/2003 Au et al.
6,505,241 B2 1/2003 Pitts
6,510,551 B1 1/2003 Miller
6,519,604 B1 2/2003 Acharya et al.
6,530,075 B1 3/2003 Beadle et al.
6,538,651 B1 3/2003 Hayman et al.
6,546,402 B1 4/2003 Beyer et al.
6,553,375 B1 4/2003 Huang et al.
6,584,474 B1 6/2003 Pereira
6,604,104 B1 8/2003 Smith
6,618,720 B1 9/2003 Au et al.
6,631,374 B1 10/2003 Klein et al.
6,640,234 B1 10/2003 Coffen et al.
6,697,880 B1 2/2004 Dougherty
6,701,415 B1 3/2004 Hendren
6,714,962 B1 3/2004 Helland et al.
6,725,243 B2 4/2004 Snapp
6,732,100 B1 5/2004 Brodersen et al.
6,745,332 B1 6/2004 Wong et al.
6,748,374 B1 6/2004 Madan et al.
6,748,455 B1 6/2004 Hinson et al.
6,760,719 B1 7/2004 Hanson et al.
6,775,660 B2 8/2004 Lin et al.
6,785,668 B1 8/2004 Polo et al.
6,795,851 B1 9/2004 Noy
6,801,908 B1 10/2004 Fuloria et al.
6,816,855 B2 11/2004 Hartel et al.
6,820,082 B1 11/2004 Cook et al.
6,829,620 B2 12/2004 Michael et al.
6,832,229 B2 12/2004 Reed
6,851,088 B1 2/2005 Conner et al.
6,882,994 B2 4/2005 Yoshimura et al.
6,925,472 B2 8/2005 Kong
6,934,717 B1 8/2005 James
6,947,928 B2 9/2005 Dettinger et al.
6,983,291 B1 1/2006 Cochrane et al.
6,985,895 B2 1/2006 Witkowski et al.
6,985,899 B2 1/2006 Chan et al.
6,985,904 B1 1/2006 Kaluskar et al.

(56) References Cited

U.S. PATENT DOCUMENTS

| | | | |
|---|---|---|---|
| 7,020,649 | B2 | 3/2006 | Cochrane et al. |
| 7,024,414 | B2 | 4/2006 | Sah et al. |
| 7,031,962 | B2 | 4/2006 | Moses |
| 7,047,484 | B1 | 5/2006 | Becker et al. |
| 7,058,657 | B1 | 6/2006 | Berno |
| 7,089,228 | B2 | 8/2006 | Arnold et al. |
| 7,089,245 | B1 | 8/2006 | George et al. |
| 7,096,216 | B2 | 8/2006 | Anonsen |
| 7,099,927 | B2 | 8/2006 | Cudd et al. |
| 7,103,608 | B1 | 9/2006 | Ozbutun et al. |
| 7,110,997 | B1 | 9/2006 | Turkel et al. |
| 7,127,462 | B2 | 10/2006 | Hiraga et al. |
| 7,146,357 | B2 | 12/2006 | Suzuki et al. |
| 7,149,742 | B1 | 12/2006 | Eastham et al. |
| 7,167,870 | B2 | 1/2007 | Avvari et al. |
| 7,171,469 | B2 | 1/2007 | Ackaouy et al. |
| 7,174,341 | B2 | 2/2007 | Ghukasyan et al. |
| 7,181,686 | B1 | 2/2007 | Bahrs |
| 7,188,105 | B2 | 3/2007 | Dettinger et al. |
| 7,200,620 | B2 | 4/2007 | Gupta |
| 7,216,115 | B1 | 5/2007 | Walters et al. |
| 7,216,116 | B1 | 5/2007 | Nilsson et al. |
| 7,219,302 | B1 | 5/2007 | O'Shaughnessy et al. |
| 7,225,189 | B1 | 5/2007 | McCormack et al. |
| 7,254,808 | B2 | 8/2007 | Trappen et al. |
| 7,257,689 | B1 | 8/2007 | Baird |
| 7,272,605 | B1 | 9/2007 | Hinshaw et al. |
| 7,308,580 | B2 | 12/2007 | Nelson et al. |
| 7,316,003 | B1 | 1/2008 | Dulepet et al. |
| 7,330,969 | B2 | 2/2008 | Harrison et al. |
| 7,333,941 | B1 | 2/2008 | Choi |
| 7,343,585 | B1 | 3/2008 | Lau et al. |
| 7,350,237 | B2 | 3/2008 | Vogel et al. |
| 7,380,242 | B2 | 5/2008 | Alaluf |
| 7,401,088 | B2 | 7/2008 | Chintakayala et al. |
| 7,426,521 | B2 | 9/2008 | Harter |
| 7,430,549 | B2 | 9/2008 | Zane et al. |
| 7,433,863 | B2 | 10/2008 | Zane et al. |
| 7,447,865 | B2 | 11/2008 | Uppala et al. |
| 7,478,094 | B2 | 1/2009 | Ho et al. |
| 7,484,096 | B1 | 1/2009 | Garg et al. |
| 7,493,311 | B1 | 2/2009 | Cutsinger et al. |
| 7,506,055 | B2 | 3/2009 | McClain et al. |
| 7,523,462 | B1 | 4/2009 | Nesamoney et al. |
| 7,529,734 | B2 | 5/2009 | Dirisala |
| 7,529,750 | B2 | 5/2009 | Bair |
| 7,542,958 | B1 | 6/2009 | Warren et al. |
| 7,552,223 | B1 | 6/2009 | Ackaouy et al. |
| 7,596,550 | B2 | 9/2009 | Mordvinov et al. |
| 7,610,351 | B1 | 10/2009 | Gollapudi et al. |
| 7,620,687 | B2 | 11/2009 | Chen et al. |
| 7,624,126 | B2 | 11/2009 | Pizzo et al. |
| 7,627,603 | B2 | 12/2009 | Rosenblum et al. |
| 7,661,141 | B2 | 2/2010 | Dutta et al. |
| 7,664,778 | B2 | 2/2010 | Yagoub et al. |
| 7,672,275 | B2 | 3/2010 | Yajnik et al. |
| 7,680,782 | B2 | 3/2010 | Chen et al. |
| 7,711,716 | B2 | 5/2010 | Stonecipher |
| 7,711,740 | B2 | 5/2010 | Minore et al. |
| 7,711,788 | B2 | 5/2010 | Ran et al. |
| 7,747,640 | B2 | 6/2010 | Dellinger et al. |
| 7,761,444 | B2 | 7/2010 | Zhang et al. |
| 7,797,356 | B2 | 9/2010 | Iyer et al. |
| 7,827,204 | B2 | 11/2010 | Heinzel et al. |
| 7,827,403 | B2 | 11/2010 | Wong et al. |
| 7,827,523 | B2 | 11/2010 | Ahmed et al. |
| 7,882,121 | B2 | 2/2011 | Bruno et al. |
| 7,882,132 | B2 | 2/2011 | Ghatare |
| 7,895,191 | B2 | 2/2011 | Colossi et al. |
| 7,904,487 | B2 | 3/2011 | Ghatare |
| 7,908,259 | B2 | 3/2011 | Branscome et al. |
| 7,908,266 | B2 | 3/2011 | Zeringue et al. |
| 7,930,412 | B2 | 4/2011 | Yeap et al. |
| 7,966,311 | B2 | 6/2011 | Haase |
| 7,966,312 | B2 | 6/2011 | Nolan et al. |
| 7,966,343 | B2 | 6/2011 | Yang et al. |
| 7,970,777 | B2 | 6/2011 | Saxena et al. |
| 7,979,431 | B2 | 7/2011 | Qazi et al. |
| 7,984,043 | B1 | 7/2011 | Waas |
| 8,019,795 | B2 | 9/2011 | Anderson et al. |
| 8,027,293 | B2 | 9/2011 | Spaur et al. |
| 8,032,525 | B2 | 10/2011 | Bowers et al. |
| 8,037,542 | B2 | 10/2011 | Taylor et al. |
| 8,046,394 | B1 | 10/2011 | Shatdal |
| 8,046,749 | B1 | 10/2011 | Owen et al. |
| 8,055,672 | B2 | 11/2011 | Djugash et al. |
| 8,060,484 | B2 | 11/2011 | Bandera et al. |
| 8,171,018 | B2 | 5/2012 | Zane et al. |
| 8,180,623 | B2 | 5/2012 | Lendermann et al. |
| 8,180,789 | B1 | 5/2012 | Wasserman et al. |
| 8,196,121 | B2 | 6/2012 | Peshansky et al. |
| 8,209,356 | B1 | 6/2012 | Roesler |
| 8,286,189 | B2 | 10/2012 | Kukreja et al. |
| 8,321,833 | B2 | 11/2012 | Langworthy et al. |
| 8,332,435 | B2 | 12/2012 | Ballard et al. |
| 8,359,305 | B1 | 1/2013 | Burke et al. |
| 8,375,127 | B1 | 2/2013 | Lita |
| 8,380,757 | B1 | 2/2013 | Bailey et al. |
| 8,418,142 | B2 | 4/2013 | Ao et al. |
| 8,433,701 | B2 | 4/2013 | Sargeant et al. |
| 8,458,218 | B2 | 6/2013 | Wildermuth |
| 8,473,897 | B2 | 6/2013 | Box et al. |
| 8,478,713 | B2 | 7/2013 | Cotner et al. |
| 8,515,942 | B2 | 8/2013 | Marum et al. |
| 8,543,620 | B2 | 9/2013 | Ching |
| 8,553,028 | B1 | 10/2013 | Urbach |
| 8,555,263 | B2 | 10/2013 | Allen et al. |
| 8,560,502 | B2 | 10/2013 | Vora |
| 8,595,151 | B2 | 11/2013 | Hao et al. |
| 8,601,016 | B2 | 12/2013 | Briggs et al. |
| 8,621,424 | B2 | 12/2013 | Kejariwal et al. |
| 8,631,034 | B1 | 1/2014 | Peloski |
| 8,635,251 | B1 | 1/2014 | Chan |
| 8,650,182 | B2 | 2/2014 | Murthy |
| 8,660,869 | B2 | 2/2014 | MacIntyre et al. |
| 8,676,863 | B1 | 3/2014 | Connell et al. |
| 8,683,488 | B2 | 3/2014 | Kukreja et al. |
| 8,713,518 | B2 | 4/2014 | Pointer et al. |
| 8,719,252 | B2 | 5/2014 | Miranker et al. |
| 8,725,707 | B2 | 5/2014 | Chen et al. |
| 8,726,254 | B2 | 5/2014 | Rohde et al. |
| 8,745,014 | B2 | 6/2014 | Travis |
| 8,745,510 | B2 | 6/2014 | D'Alo' et al. |
| 8,751,823 | B2 | 6/2014 | Myles et al. |
| 8,768,961 | B2 | 7/2014 | Krishnamurthy |
| 8,775,412 | B2 | 7/2014 | Day et al. |
| 8,788,254 | B2 | 7/2014 | Peloski |
| 8,793,243 | B2 | 7/2014 | Weyerhaeuser et al. |
| 8,805,875 | B1 | 8/2014 | Bawcom et al. |
| 8,805,947 | B1 | 8/2014 | Kuzkin et al. |
| 8,806,133 | B2 | 8/2014 | Hay et al. |
| 8,812,625 | B1 | 8/2014 | Chitilian et al. |
| 8,838,656 | B1 | 9/2014 | Cheriton |
| 8,855,999 | B1 | 10/2014 | Elliot |
| 8,863,156 | B1 | 10/2014 | Lepanto et al. |
| 8,874,512 | B2 | 10/2014 | Jin et al. |
| 8,880,569 | B2 | 11/2014 | Draper et al. |
| 8,880,787 | B1 | 11/2014 | Kimmel et al. |
| 8,881,121 | B2 | 11/2014 | Ali |
| 8,886,631 | B2 | 11/2014 | Abadi et al. |
| 8,903,717 | B2 | 12/2014 | Elliot |
| 8,903,842 | B2 | 12/2014 | Bloesch et al. |
| 8,922,579 | B2 | 12/2014 | Mi et al. |
| 8,924,384 | B2 | 12/2014 | Driesen et al. |
| 8,930,892 | B2 | 1/2015 | Pointer et al. |
| 8,954,418 | B2 | 2/2015 | Faerber et al. |
| 8,959,495 | B2 | 2/2015 | Chafi et al. |
| 8,996,864 | B2 | 3/2015 | Maigne et al. |
| 9,031,930 | B2 | 5/2015 | Valentin |
| 9,077,611 | B2 | 7/2015 | Cordray et al. |
| 9,122,765 | B1 | 9/2015 | Chen |
| 9,177,079 | B1 | 11/2015 | Ramachandran et al. |
| 9,195,712 | B2 | 11/2015 | Freedman et al. |
| 9,298,768 | B2 | 3/2016 | Varakin et al. |

(56) References Cited

U.S. PATENT DOCUMENTS

| | | | |
|---|---|---|---|
| 9,311,357 | B2 | 4/2016 | Ramesh et al. |
| 9,372,671 | B2 | 6/2016 | Balan et al. |
| 9,384,184 | B2 | 7/2016 | Acuña et al. |
| 9,477,702 | B1 | 10/2016 | Ramachandran et al. |
| 9,612,959 | B2 | 4/2017 | Caudy et al. |
| 9,613,018 | B2 | 4/2017 | Zeldis et al. |
| 9,613,109 | B2 | 4/2017 | Wright et al. |
| 9,619,210 | B2 | 4/2017 | Kent, I et al. |
| 9,633,060 | B2 | 4/2017 | Caudy et al. |
| 9,639,570 | B2 | 5/2017 | Wright et al. |
| 9,672,238 | B2 | 6/2017 | Wright et al. |
| 9,679,006 | B2 | 6/2017 | Wright et al. |
| 9,690,821 | B2 | 6/2017 | Wright et al. |
| 9,710,511 | B2 | 7/2017 | Wright et al. |
| 9,760,591 | B2 | 9/2017 | Caudy et al. |
| 9,805,084 | B2 | 10/2017 | Wright et al. |
| 9,832,068 | B2 | 11/2017 | McSherry et al. |
| 9,836,494 | B2 | 12/2017 | Caudy et al. |
| 9,836,495 | B2 | 12/2017 | Wright |
| 9,847,917 | B2 | 12/2017 | Varney et al. |
| 9,852,231 | B1 | 12/2017 | Ravi et al. |
| 9,886,469 | B2 | 2/2018 | Kent, I et al. |
| 9,898,496 | B2 | 2/2018 | Caudy et al. |
| 9,934,266 | B2 | 4/2018 | Wright et al. |
| 10,002,153 | B2 | 6/2018 | Teodorescu et al. |
| 10,002,154 | B1 | 6/2018 | Kent, I et al. |
| 10,002,155 | B1 | 6/2018 | Caudy et al. |
| 10,003,673 | B2 | 6/2018 | Caudy et al. |
| 10,019,138 | B2 | 7/2018 | Zeldis et al. |
| 10,069,943 | B2 | 9/2018 | Teodorescu et al. |
| 10,521,449 | B1 | 12/2019 | Schwartz et al. |
| 2002/0002576 | A1 | 1/2002 | Wollrath et al. |
| 2002/0007331 | A1 | 1/2002 | Lo et al. |
| 2002/0054587 | A1 | 5/2002 | Baker et al. |
| 2002/0065981 | A1 | 5/2002 | Jenne et al. |
| 2002/0129168 | A1 | 9/2002 | Kanai et al. |
| 2002/0156722 | A1 | 10/2002 | Greenwood |
| 2003/0004952 | A1 | 1/2003 | Nixon et al. |
| 2003/0004964 | A1 | 1/2003 | Cameron et al. |
| 2003/0061216 | A1 | 3/2003 | Moses |
| 2003/0074400 | A1 | 4/2003 | Brooks et al. |
| 2003/0110416 | A1 | 6/2003 | Morrison et al. |
| 2003/0115212 | A1 | 6/2003 | Hornibrook et al. |
| 2003/0167261 | A1 | 9/2003 | Grust et al. |
| 2003/0177139 | A1 | 9/2003 | Cameron et al. |
| 2003/0182261 | A1 | 9/2003 | Patterson |
| 2003/0187744 | A1 | 10/2003 | Goodridge |
| 2003/0208484 | A1 | 11/2003 | Chang et al. |
| 2003/0208505 | A1 | 11/2003 | Mullins et al. |
| 2003/0233632 | A1 | 12/2003 | Aigen et al. |
| 2004/0002961 | A1 | 1/2004 | Dellinger et al. |
| 2004/0015566 | A1 | 1/2004 | Anderson et al. |
| 2004/0076155 | A1 | 4/2004 | Yajnik et al. |
| 2004/0090472 | A1 | 5/2004 | Risch et al. |
| 2004/0111492 | A1 | 6/2004 | Nakahara et al. |
| 2004/0148630 | A1 | 7/2004 | Choi |
| 2004/0186813 | A1 | 9/2004 | Tedesco et al. |
| 2004/0216150 | A1 | 10/2004 | Scheifler et al. |
| 2004/0220923 | A1 | 11/2004 | Nica |
| 2004/0254876 | A1 | 12/2004 | Coval et al. |
| 2004/0267824 | A1 | 12/2004 | Pizzo et al. |
| 2005/0015490 | A1 | 1/2005 | Saare et al. |
| 2005/0060693 | A1 | 3/2005 | Robison et al. |
| 2005/0097447 | A1 | 5/2005 | Serra et al. |
| 2005/0102284 | A1 | 5/2005 | Srinivasan et al. |
| 2005/0102636 | A1 | 5/2005 | McKeon et al. |
| 2005/0131893 | A1 | 6/2005 | Glan |
| 2005/0132384 | A1 | 6/2005 | Morrison et al. |
| 2005/0138624 | A1 | 6/2005 | Morrison et al. |
| 2005/0144189 | A1 | 6/2005 | Edwards et al. |
| 2005/0165866 | A1 | 7/2005 | Bohannon et al. |
| 2005/0198001 | A1 | 9/2005 | Cunningham et al. |
| 2005/0228828 | A1 | 10/2005 | Chandrasekar et al. |
| 2006/0059253 | A1 | 3/2006 | Goodman et al. |
| 2006/0074901 | A1 | 4/2006 | Pirahesh et al. |
| 2006/0085490 | A1 | 4/2006 | Baron et al. |
| 2006/0100989 | A1 | 5/2006 | Chinchwadkar et al. |
| 2006/0101019 | A1 | 5/2006 | Nelson et al. |
| 2006/0116983 | A1 | 6/2006 | Dellinger et al. |
| 2006/0116999 | A1 | 6/2006 | Dettinger et al. |
| 2006/0123024 | A1 | 6/2006 | Sathyanarayan et al. |
| 2006/0131383 | A1 | 6/2006 | Battagin et al. |
| 2006/0136361 | A1 | 6/2006 | Peri et al. |
| 2006/0173693 | A1 * | 8/2006 | Arazi .................... G06Q 30/02 705/36 R |
| 2006/0195460 | A1 | 8/2006 | Nori et al. |
| 2006/0212847 | A1 | 9/2006 | Tarditi et al. |
| 2006/0218123 | A1 | 9/2006 | Chowdhuri et al. |
| 2006/0218200 | A1 | 9/2006 | Factor et al. |
| 2006/0230016 | A1 | 10/2006 | Cunningham et al. |
| 2006/0235786 | A1 | 10/2006 | DiSalvo |
| 2006/0253311 | A1 | 11/2006 | Yin et al. |
| 2006/0271510 | A1 | 11/2006 | Harward et al. |
| 2006/0277162 | A1 | 12/2006 | Smith |
| 2006/0277319 | A1 | 12/2006 | Elien et al. |
| 2007/0011211 | A1 | 1/2007 | Reeves et al. |
| 2007/0027884 | A1 | 2/2007 | Heger et al. |
| 2007/0033518 | A1 | 2/2007 | Kenna et al. |
| 2007/0073765 | A1 | 3/2007 | Chen |
| 2007/0101252 | A1 | 5/2007 | Chamberlain et al. |
| 2007/0113014 | A1 | 5/2007 | Manolov et al. |
| 2007/0116287 | A1 | 5/2007 | Rasizade et al. |
| 2007/0118619 | A1 | 5/2007 | Schwesig et al. |
| 2007/0169003 | A1 | 7/2007 | Branda et al. |
| 2007/0198479 | A1 * | 8/2007 | Cai .................... G06F 16/8373 |
| 2007/0256060 | A1 | 11/2007 | Ryu et al. |
| 2007/0258508 | A1 | 11/2007 | Werb et al. |
| 2007/0271280 | A1 | 11/2007 | Chandasekaran |
| 2007/0294217 | A1 * | 12/2007 | Chen ................ G06F 16/24568 |
| 2007/0299822 | A1 | 12/2007 | Jopp et al. |
| 2008/0022136 | A1 | 1/2008 | Mattsson et al. |
| 2008/0033907 | A1 | 2/2008 | Woehler et al. |
| 2008/0034084 | A1 | 2/2008 | Pandya |
| 2008/0046804 | A1 | 2/2008 | Rui et al. |
| 2008/0072150 | A1 | 3/2008 | Chan et al. |
| 2008/0097748 | A1 | 4/2008 | Haley et al. |
| 2008/0120283 | A1 | 5/2008 | Liu et al. |
| 2008/0155565 | A1 | 6/2008 | Poduri |
| 2008/0168135 | A1 | 7/2008 | Redlich et al. |
| 2008/0172639 | A1 | 7/2008 | Keysar et al. |
| 2008/0235238 | A1 | 9/2008 | Jalobeanu et al. |
| 2008/0263179 | A1 | 10/2008 | Buttner et al. |
| 2008/0276241 | A1 | 11/2008 | Bajpai et al. |
| 2008/0319951 | A1 | 12/2008 | Ueno et al. |
| 2009/0019029 | A1 | 1/2009 | Tommaney et al. |
| 2009/0022095 | A1 | 1/2009 | Spaur et al. |
| 2009/0024615 | A1 * | 1/2009 | Pedro .................... G06F 19/324 |
| 2009/0037391 | A1 | 2/2009 | Agrawal et al. |
| 2009/0037500 | A1 | 2/2009 | Kirshenbaum |
| 2009/0055370 | A1 | 2/2009 | Dagum et al. |
| 2009/0083215 | A1 | 3/2009 | Burger |
| 2009/0089312 | A1 | 4/2009 | Chi et al. |
| 2009/0157723 | A1 | 6/2009 | Peuter et al. |
| 2009/0248902 | A1 | 10/2009 | Blue |
| 2009/0254516 | A1 | 10/2009 | Meiyyappan et al. |
| 2009/0271472 | A1 | 10/2009 | Scheifler et al. |
| 2009/0300770 | A1 | 12/2009 | Rowney et al. |
| 2009/0319058 | A1 | 12/2009 | Rovaglio et al. |
| 2009/0319484 | A1 | 12/2009 | Golbandi et al. |
| 2009/0327242 | A1 | 12/2009 | Brown et al. |
| 2010/0023952 | A1 | 1/2010 | Sandoval et al. |
| 2010/0036801 | A1 | 2/2010 | Pirvali et al. |
| 2010/0042587 | A1 | 2/2010 | Johnson et al. |
| 2010/0047760 | A1 | 2/2010 | Best et al. |
| 2010/0049715 | A1 | 2/2010 | Jacobsen et al. |
| 2010/0057835 | A1 | 3/2010 | Little |
| 2010/0070721 | A1 * | 3/2010 | Pugh ......................... G06F 8/71 711/162 |
| 2010/0114890 | A1 | 5/2010 | Hagar et al. |
| 2010/0161555 | A1 | 6/2010 | Nica et al. |
| 2010/0186082 | A1 | 7/2010 | Ladki et al. |
| 2010/0199161 | A1 | 8/2010 | Aureglia et al. |
| 2010/0205017 | A1 | 8/2010 | Sichelman et al. |
| 2010/0205351 | A1 | 8/2010 | Wiener et al. |

(56) References Cited

U.S. PATENT DOCUMENTS

2010/0281005 A1 11/2010 Carlin et al.
2010/0281071 A1 11/2010 Ben-Zvi et al.
2010/0293334 A1 11/2010 Xun et al.
2011/0126110 A1 5/2011 Vilke et al.
2011/0126154 A1 5/2011 Boehler et al.
2011/0153603 A1 6/2011 Adiba et al.
2011/0161378 A1 6/2011 Williamson
2011/0167020 A1 7/2011 Yang et al.
2011/0178984 A1 7/2011 Talius et al.
2011/0194563 A1 8/2011 Shen et al.
2011/0219020 A1 9/2011 Oks et al.
2011/0231389 A1 9/2011 Suma et al.
2011/0314019 A1 12/2011 Peris
2012/0005238 A1 1/2012 Jebara et al.
2012/0110030 A1 5/2012 Pomponio
2012/0144234 A1 6/2012 Clark et al.
2012/0159303 A1 6/2012 Friedrich et al.
2012/0191446 A1 7/2012 Binsztok et al.
2012/0191582 A1 7/2012 Rance et al.
2012/0192096 A1 7/2012 Bowman et al.
2012/0197868 A1 8/2012 Fauser et al.
2012/0209886 A1 8/2012 Henderson
2012/0215741 A1 8/2012 Poole et al.
2012/0221528 A1 8/2012 Renkes
2012/0246052 A1 9/2012 Taylor et al.
2012/0246094 A1 9/2012 Hsu et al.
2012/0254143 A1 10/2012 Varma et al.
2012/0259759 A1 10/2012 Crist et al.
2012/0296846 A1 11/2012 Teeter
2013/0041946 A1 2/2013 Joel et al.
2013/0080514 A1 3/2013 Gupta et al.
2013/0086107 A1 4/2013 Genochio et al.
2013/0166551 A1 6/2013 Wong et al.
2013/0166556 A1 6/2013 Baeumges et al.
2013/0173667 A1 7/2013 Soderberg et al.
2013/0179460 A1 7/2013 Cervantes et al.
2013/0185619 A1 7/2013 Ludwig
2013/0191370 A1 7/2013 Chen et al.
2013/0198232 A1 8/2013 Shamgunov et al.
2013/0226959 A1 8/2013 Dittrich et al.
2013/0246560 A1 9/2013 Feng et al.
2013/0263123 A1 10/2013 Zhou et al.
2013/0290243 A1 10/2013 Hazel et al.
2013/0304725 A1 11/2013 Nee et al.
2013/0304744 A1* 11/2013 McSherry ......... G06F 16/24568 707/741
2013/0311352 A1 11/2013 Kayanuma et al.
2013/0311488 A1 11/2013 Erdogan et al.
2013/0318129 A1 11/2013 Vingralek et al.
2013/0346365 A1 12/2013 Kan et al.
2014/0019494 A1 1/2014 Tang
2014/0026121 A1 1/2014 Jackson et al.
2014/0040203 A1 2/2014 Lu et al.
2014/0046638 A1 2/2014 Peloski
2014/0059646 A1 2/2014 Hannel et al.
2014/0082470 A1 3/2014 Trebas et al.
2014/0082724 A1 3/2014 Pearson et al.
2014/0095365 A1 4/2014 Potekhina et al.
2014/0136521 A1 5/2014 Pappas
2014/0143123 A1 5/2014 Banke et al.
2014/0149947 A1 5/2014 Blyumen
2014/0149997 A1 5/2014 Kukreja et al.
2014/0156618 A1 6/2014 Castellano
2014/0156632 A1 6/2014 Yu et al.
2014/0173023 A1 6/2014 Vamey et al.
2014/0181036 A1 6/2014 Dhamankar et al.
2014/0181081 A1 6/2014 Veldhuizen
2014/0188924 A1 7/2014 Ma et al.
2014/0195558 A1 7/2014 Murthy et al.
2014/0201194 A1 7/2014 Reddy et al.
2014/0215446 A1 7/2014 Araya et al.
2014/0222768 A1 8/2014 Rambo et al.
2014/0229506 A1 8/2014 Lee
2014/0229874 A1 8/2014 Strauss
2014/0244687 A1 8/2014 Shmueli
2014/0279810 A1 9/2014 Mann et al.
2014/0280522 A1 9/2014 Watte
2014/0282227 A1 9/2014 Nixon et al.
2014/0282444 A1 9/2014 Araya et al.
2014/0282540 A1 9/2014 Bonnet et al.
2014/0289700 A1 9/2014 Srinivasaraghavan et al.
2014/0292765 A1 10/2014 Maruyama et al.
2014/0297611 A1 10/2014 Abbour et al.
2014/0317084 A1 10/2014 Chaudhry et al.
2014/0321280 A1 10/2014 Evans
2014/0324821 A1 10/2014 Meiyyappan et al.
2014/0330700 A1 11/2014 Studnitzer et al.
2014/0330807 A1 11/2014 Weyerhaeuser et al.
2014/0344186 A1 11/2014 Nadler
2014/0344391 A1 11/2014 Vamey et al.
2014/0358892 A1 12/2014 Nizami et al.
2014/0359574 A1 12/2014 Beckwith et al.
2014/0369550 A1 12/2014 Davis et al.
2014/0372482 A1 12/2014 Martin et al.
2014/0380051 A1 12/2014 Edward et al.
2015/0019516 A1 1/2015 Wein et al.
2015/0026155 A1 1/2015 Martin
2015/0032789 A1 1/2015 Nguyen et al.
2015/0067640 A1 3/2015 Booker et al.
2015/0074066 A1 3/2015 Li et al.
2015/0082218 A1 3/2015 Affoneh et al.
2015/0088894 A1 3/2015 Czarlinska et al.
2015/0095381 A1 4/2015 Chen et al.
2015/0120261 A1* 4/2015 Giannacopoulos ..... G06F 30/23 703/2
2015/0127599 A1 5/2015 Schiebeler
2015/0154262 A1 6/2015 Yang et al.
2015/0172117 A1 6/2015 Dolinsky et al.
2015/0188778 A1 7/2015 Asayag et al.
2015/0205588 A1 7/2015 Bates et al.
2015/0205589 A1* 7/2015 Dally .................... G06F 8/4432 717/156
2015/0254298 A1 9/2015 Bourbonnais et al.
2015/0304182 A1 10/2015 Brodsky et al.
2015/0317359 A1 11/2015 Tran et al.
2015/0356157 A1 12/2015 Anderson et al.
2016/0026383 A1 1/2016 Lee et al.
2016/0026442 A1 1/2016 Chhaparia
2016/0065670 A1 3/2016 Kimmel et al.
2016/0085772 A1 3/2016 Vermeulen et al.
2016/0092599 A1 3/2016 Barsness et al.
2016/0103897 A1 4/2016 Nysewander et al.
2016/0125018 A1 5/2016 Tomoda et al.
2016/0147748 A1 5/2016 Florendo et al.
2016/0171070 A1 6/2016 Hrle et al.
2016/0179754 A1 6/2016 Borza et al.
2016/0253294 A1 9/2016 Allen et al.
2016/0316038 A1 10/2016 Jolfaei
2016/0335281 A1 11/2016 Teodoresou et al.
2016/0335304 A1 11/2016 Teodoresou et al.
2016/0335317 A1 11/2016 Teodoresou et al.
2016/0335323 A1 11/2016 Teodoresou et al.
2016/0335330 A1 11/2016 Teodoresou et al.
2016/0335361 A1 11/2016 Teodoresou et al.
2017/0032016 A1 2/2017 Zinner et al.
2017/0161514 A1 6/2017 Dellinger et al.
2017/0177677 A1 6/2017 Wright et al.
2017/0185385 A1 6/2017 Kent, I et al.
2017/0192910 A1 7/2017 Wright et al.
2017/0206229 A1 7/2017 Caudy et al.
2017/0206256 A1 7/2017 Tsirogiannis et al.
2017/0235794 A1 8/2017 Wright et al.
2017/0235798 A1 8/2017 Wright et al.
2017/0249350 A1 8/2017 Wright et al.
2017/0270150 A1 9/2017 Wright et al.
2017/0316046 A1 11/2017 Caudy et al.
2017/0329740 A1 11/2017 Crawford et al.
2017/0357708 A1 12/2017 Ramachandran et al.
2017/0359415 A1 12/2017 Venkatraman et al.
2018/0004796 A1 1/2018 Kent, I et al.
2018/0011891 A1 1/2018 Wright et al.
2018/0052879 A1 2/2018 Wright
2018/0137175 A1 5/2018 Teodorescu et al.

(56) References Cited

U.S. PATENT DOCUMENTS

FOREIGN PATENT DOCUMENTS

| | | | |
|---|---|---|---|
| EP | 1198769 | B1 | 6/2008 |
| EP | 2199961 | A1 | 6/2010 |
| EP | 2423816 | A1 | 2/2012 |
| EP | 2743839 | A1 | 6/2014 |
| GB | 2397906 | A | 8/2004 |
| RU | 2421798 | | 6/2011 |
| WO | 2000000879 | A2 | 1/2000 |
| WO | 2001079964 | A2 | 10/2001 |
| WO | 2011120161 | A1 | 10/2011 |
| WO | 2012136627 | A1 | 10/2012 |
| WO | 2014026220 | A1 | 2/2014 |
| WO | 2014143208 | A1 | 9/2014 |
| WO | 2016183563 | A1 | 11/2016 |

OTHER PUBLICATIONS

Final Office Action dated Oct. 1, 2018, in U.S. Appl. No. 15/154,993.
Gai, Lei et al. "An Efficient Summary Graph Driven Method for RDF Query Processing", dated Oct. 27, 2015. Retreived from http://arxiv.org/pdf/1510.07749.pdf.
International Search Report and Written Opinion dated Aug. 18, 2016, in International Appln. No. PCT/US2016/032582 filed May 14, 2016.
International Search Report and Written Opinion dated Aug. 18, 2016, in International Appln. No. PCT/US2016/032584 filed May 14, 2016.
International Search Report and Written Opinion dated Aug. 18, 2016, in International Appln. No. PCT/US2016/032588 filed May 14, 2016.
International Search Report and Written Opinion dated Aug. 18, 2016, in International Appln. No. PCT/US2016/032593 filed May 14, 2016.
International Search Report and Written Opinion dated Aug. 18, 2016, in International Appln. No. PCT/US2016/032597 filed May 14, 2016.
International Search Report and Written Opinion dated Aug. 18, 2016, in International Appln. No. PCT/US2016/032599 filed May 14, 2016.
International Search Report and Written Opinion dated Aug. 18, 2016, in International Appln. No. PCT/US2016/032605 filed May 14, 2016.
International Search Report and Written Opinion dated Aug. 25, 2016, in International Appln. No. PCT/US2016/032590 filed May 14, 2016.
International Search Report and Written Opinion dated Aug. 25, 2016, in International Appln. No. PCT/US2016/032592 filed May 14, 2016.
International Search Report and Written Opinion dated Aug. 4, 2016, in International Appln. No. PCT/US2016/032581 filed May 14, 2016.
International Search Report and Written Opinion dated Jul. 28, 2016, in International Appln. No. PCT/US2016/032586 filed May 14, 2016.
International Search Report and Written Opinion dated Jul. 28, 2016, in International Appln. No. PCT/US2016/032587 filed May 14, 2016.
International Search Report and Written Opinion dated Jul. 28, 2016, in International Appln. No. PCT/US2016/032589 filed May 14, 2016.
International Search Report and Written Opinion dated Sep. 1, 2016, in International Appln. No. PCT/US2016/032596 filed May 14, 2016.
International Search Report and Written Opinion dated Sep. 1, 2016, in International Appln. No. PCT/US2016/032598 filed May 14, 2016.
International Search Report and Written Opinion dated Sep. 1, 2016, in International Appln. No. PCT/US2016/032601 filed May 14, 2016.
International Search Report and Written Opinion dated Sep. 1, 2016, in International Appln. No. PCT/US2016/032602 filed May 14, 2016.
International Search Report and Written Opinion dated Sep. 1, 2016, in International Appln. No. PCT/US2016/032607 filed May 14, 2016.
International Search Report and Written Opinion dated Sep. 15, 2016, in International Appln. No. PCT/US2016/032591 filed May 14, 2016.
International Search Report and Written Opinion dated Sep. 15, 2016, in International Appln. No. PCT/US2016/032594 filed May 14, 2016.
International Search Report and Written Opinion dated Sep. 15, 2016, in International Appln. No. PCT/US2016/032600 filed May 14, 2016.
International Search Report and Written Opinion dated Sep. 29, 2016, in International Appln. No. PCT/US2016/032595 filed May 14, 2016.
International Search Report and Written Opinion dated Sep. 29, 2016, in International Appln. No. PCT/US2016/032606 filed May 14, 2016.
International Search Report and Written Opinion dated Sep. 8, 2016, in International Appln. No. PCT/US2016/032603 filed May 14, 2016.
International Search Report and Written Opinion dated Sep. 8, 2016, in International Appln. No. PCT/US2016/032604 filed May 14, 2016.
Jellema, Lucas. "Implementing Cell Highlighting in JSF-based Rich Enterprise Apps (Part 1)", dated Nov. 2008. Retrieved from http://www.oracle.com/technetwork/articles/adf/jellema-adfcellhighlighting-087850.html (last accessed Jun. 16, 2016).
Kramer, The Combining DAG: A Technique for Parallel Data Flow Analysis, IEEE Transactions on Parallel and Distributed Systems, vol. 5, No. 8, Aug. 1994, pp. 805-813.
Lou, Yuan. "A Multi-Agent Decision Support System for Stock Trading", IEEE Network, Jan./Feb. 2002. Retreived from http://www.reading.ac.uk/AcaDepts/si/sisweb13/ais/papers/journal12-A%20multi-agent%20Framework.pdf.
Mallet, "Relational Database Support for Spatio-Temporal Data", Technical Report TR 04-21, Sep. 2004, University of Alberta, Department of Computing Science.
Mariyappan, Balakrishnan. "10 Useful Linux Bash_Completion Complete Command Examples (Bash Command Line Completion on Steroids)", dated Dec. 2, 2013. Retrieved from http://www.thegeekstuff.com/2013/12/bash-completion-complete/ (last accessed Jun. 16, 2016).
Murray, Derek G. et al. "Naiad: a timely dataflow system." SOSP '13 Proceedings of the Twenty-Fourth ACM Symposium on Operating Systems Principles. pp. 439-455. Nov. 2013.
Non-final Office Action dated Apr. 12, 2018, in U.S. Appl. No. 15/154,997.
Non-final Office Action dated Apr. 19, 2017, in U.S. Appl. No. 15/154,974.
Non-final Office Action dated Apr. 23, 2018, in U.S. Appl. No. 15/813,127.
Non-final Office Action dated Apr. 5, 2018, in U.S. Appl. No. 15/154,984.
Non-final Office Action dated Aug. 10, 2018, in U.S. Appl. No. 16/004,578.
Non-final Office Action dated Aug. 12, 2016, in U.S. Appl. No. 15/155,001.
Non-final Office Action dated Aug. 14, 2017, in U.S. Appl. No. 15/464,314.
Non-final Office Action dated Aug. 16, 2016, in U.S. Appl. No. 15/154,993.
Non-final Office Action dated Aug. 19, 2016, in U.S. Appl. No. 15/154,991.
Non-final Office Action dated Aug. 25, 2016, in U.S. Appl. No. 15/154,980.

(56) References Cited

OTHER PUBLICATIONS

Non-final Office Action dated Aug. 26, 2016, in U.S. Appl. No. 15/154,995.
Non-final Office Action dated Aug. 8, 2016, in U.S. Appl. No. 15/154,983.
Non-final Office Action dated Aug. 8, 2016, in U.S. Appl. No. 15/154,985.
Non-final Office Action dated Dec. 13, 2017, in U.S. Appl. No. 15/608,963.
Non-final Office Action dated Dec. 28, 2017, in U.S. Appl. No. 15/154,996.
Non-final Office Action dated Dec. 28, 2017, in U.S. Appl. No. 15/796,230.
Hartle, Thom, Conditional Formatting in Excel using CQG's RTD Bate Function (2011), http://news.cqg.com/blogs/exce/l2011/05/conditional-formatting-excel-using-cqgs-rtd-bate-function (last visited Apr. 3, 2019).
Maria Azbel, How to hide and group columns in Excel AbleBits (2014), https://www.ablebits.com/office-addins-blog/2014/08/06/excel-hide-columns/ (last visited Jan. 18, 2019).
Mark Dodge & Craig Stinson, Microsoft Excel 2010 inside out (2011).
Posey, Brien, "How to Combine PowerShell Cmdlets", Jun. 14, 2013 Redmond the Independent Voice of the Microsoft Community (Year: 2013).
Svetlana Cheusheve, Excel formulas for conditional formatting based on another cell AbleBits (2014), https://www.ablebits.com/office-addins-blog/2014/06/10/excel-conditional-formatting-formulas/comment-page-6/ (last visited Jan. 14, 2019).
Non-final Office Action dated Feb. 12, 2018, in U.S. Appl. No. 15/466,836.
Non-final Office Action dated Feb. 15, 2018, in U.S. Appl. No. 15/813,112.
Non-final Office Action dated Feb. 28, 2018, in U.S. Appl. No. 15/813,119.
Non-final Office Action dated Feb. 8, 2017, in U.S. Appl. No. 15/154,997.
Non-final Office Action dated Jan. 4, 2018, in U.S. Appl. No. 15/583,777.
Non-final Office Action dated Jul. 27, 2017, in U.S. Appl. No. 15/154,995.
Non-final Office Action dated Jun. 29, 2018, in U.S. Appl. No. 15/154,974.
Non-final Office Action dated Jun. 8, 2018, in U.S. Appl. 15/452,574.
Non-final Office Action dated Mar. 2, 2017, in U.S. Appl. No. 15/154,984.
Non-final Office Action dated Mar. 20, 2018, in U.S. Appl. No. 15/155,006.
Non-final Office Action dated Nov. 15, 2017, in U.S. Appl. No. 15/654,461.
Non-final Office Action dated Nov. 17, 2016, in U.S. Appl. No. 15/154,999.
Non-final Office Action dated Nov. 21, 2017, in U.S. Appl. No. 15/155,005.
Non-final Office Action dated Nov. 30, 2017, in U.S. Appl. No. 15/155,012.
Non-final Office Action dated Oct. 13, 2016, in U.S. Appl. No. 15/155,009.
Non-final Office Action dated Oct. 27, 2016, in U.S. Appl. No. 15/155,006.
Non-final Office Action dated Oct. 5, 2017, in U.S. Appl. No. 15/428,145.
Non-final Office Action dated Oct. 7, 2016, in U.S. Appl. No. 15/154,998.
Non-final Office Action dated Sep. 1, 2016, in U.S. Appl. No. 15/154,979.
Non-final Office Action dated Sep. 1, 2016, in U.S. Appl. No. 15/155,011.
Non-final Office Action dated Sep. 1, 2016, in U.S. Appl. No. 15/155,012.
Non-final Office Action dated Sep. 14, 2016, in U.S. Appl. No. 15/154,984.
Non-final Office Action dated Sep. 16, 2016, in U.S. Appl. No. 15/154,988.
Non-final Office Action dated Sep. 22, 2016, in U.S. Appl. No. 15/154,987.
Non-final Office Action dated Sep. 26, 2016, in U.S. Appl. No. 15/155,005.
Non-final Office Action dated Sep. 29, 2016, in U.S. Appl. No. 15/154,990.
Non-final Office Action dated Sep. 8, 2016, in U.S. Appl. No. 15/154,975.
Non-final Office Action dated Sep. 9, 2016, in U.S. Appl. No. 15/154,996.
Non-final Office Action dated Sep. 9, 2016, in U.S. Appl. No. 15/155,010.
Notice of Allowance dated Apr. 30, 2018, in U.S. Appl. No. 15/155,012.
Notice of Allowance dated Dec. 19, 2016, in U.S. Appl. No. 15/155,001.
Notice of Allowance dated Dec. 22, 2016, in U.S. Appl. No. 15/155,011.
Notice of Allowance dated Dec. 7, 2016, in U.S. Appl. No. 15/154,985.
Notice of Allowance dated Feb. 1, 2017, in U.S. Appl. No. 15/154,988.
Notice of Allowance dated Feb. 12, 2018, in U.S. Appl. No. 15/813,142.
Notice of Allowance dated Feb. 14, 2017, in U.S. Appl. No. 15/154,979.
Notice of Allowance dated Feb. 26, 2018, in U.S. Appl. No. 15/428,145.
Notice of Allowance dated Feb. 28, 2017, in U.S. Appl. No. 15/154,990.
Notice of Allowance dated Jan. 30, 2017, in U.S. Appl. No. 15/154,987.
Notice of Allowance dated Jul. 11, 2018, in U.S. Appl. No. 15/154,995.
Notice of Allowance dated Jul. 28, 2017, in U.S. Appl. No. 15/155,009.
Notice of Allowance dated Jun. 19, 2017, in U.S. Appl. No. 15/154,980.
Notice of Allowance dated Jun. 20, 2017, in U.S. Appl. No. 15/154,975.
Notice of Allowance dated Mar. 1, 2018, in U.S. Appl. No. 15/464,314.
Notice of Allowance dated Mar. 2, 2017, in U.S. Appl. No. 15/154,998.
Notice of Allowance dated Mar. 31, 2017, in U.S. Appl. No. 15/154,998.
Notice of Allowance dated May 10, 2017, in U.S. Appl. No. 15/154,988.
Notice of Allowance dated May 4, 2018, in U.S. Appl. No. 15/897,547.
Notice of Allowance dated Nov. 17, 2016, in U.S. Appl. No. 15/154,991.
Notice of Allowance dated Nov. 17, 2017, in U.S. Appl. No. 15/154,993.
Notice of Allowance dated Nov. 21, 2016, in U.S. Appl. No. 15/154,983.
Notice of Allowance dated Nov. 8, 2016, in U.S. Appl. No. 15/155,007.
Notice of Allowance dated Oct. 11, 2016, in U.S. Appl. No. 15/155,007.
Notice of Allowance dated Oct. 21, 2016, in U.S. Appl. No. 15/154,999.
Notice of Allowance dated Oct. 6, 2017, in U.S. Appl. No. 15/610,162.
Notice of Allowance dated Sep. 11, 2018, in U.S. Appl. No. 15/608,961.
Palpanas, Themistoklis et al. "Incremental Maintenance for Non-Distributive Aggregate Functions", Proceedings of the 28th VLDB Conference, 2002. Retreived from http://www.vldb.org/conf/2002/S22P04.pdf.

(56) References Cited

OTHER PUBLICATIONS

PowerShell Team, Intellisense in Windows PowerShell ISE 3.0, dated Jun. 12, 2012, Windows PowerShell Blog, pp. 1-6 Retrieved: https://biogs.msdn.microsoft.com/powershell/2012/06/12/intellisense-in-windows-powershell-ise-3-0/.
Smith, Ian. "Guide to Using SQL: Computed and Automatic Columns." Rdb Jornal, dated Sep. 2008, retrieved Aug. 15, 2016, retrieved from the Internet <URL: http://www.oracle.com/technetwork/products/rdb/automatic-columns-132042.pdf>.
Sobell, Mark G. "A Practical Guide to Linux, Commands, Editors and Shell Programming." Third Edition, dated Sep. 14, 2012. Retrieved from: http://techbus.safaribooksonline.com/book/operating-systems-and-server-administration/linux/9780133085129.
Wes McKinney & PyData Development Team. "pandas: powerful Python data analysis toolkit, Release 0.16.1" Dated May 11, 2015. Retrieved from: http://pandas.pydata.org/pandas-docs/version/0.16.1/index.html.
Wes McKinney & PyData Development Team. "pandas: powerful Python data analysis toolkit, Release 0.18.1" Dated May 3, 2016. Retrieved from: http://pandas.pydata.org/pandas-docs/version/0.18.1/index.html.
Wu, Buwen et al. "Scalable SPARQL Querying using Path Partitioning", 31st IEEE International Conference on Data Engineering (ICDE 2015), Seoul, Korea, Apr. 13-17, 2015. Retreived from http://imada.sdu.dk/~zhou/papers/icde2015.pdf.
"About Entering Commands in the Command Window", dated Dec. 16, 2015. Retreived from https://knowledge.autodesk.com/support/autocad/learn-explore/caas/CloudHelp/cloudhelp/2016/ENU/AutoCAD-Core/files/GUID-BB0C3E79-66AF-4557-9140-D31B4CF3C9CF-htm.html (last accessed Jun. 16, 2016).
"Change Data Capture", Oracle Database Online Documentation 11g Release 1 (11.1), dated Apr. 5, 2016. Retreived from https://web.archive.org/web/20160405032625/http://docs.oracle.com/cd/B28359_01/server.111/b28313/cdc.htm.
"Chapter 24. Query access plans", Tuning Database Performance, DB2 Version 9.5 for Linux, UNIX, and Windows, pp. 301-462, dated Dec. 2010. Retreived from http://public.dhe.ibm.com/ps/products/db2/info/vr95/pdf/en_US/DB2PerfTuneTroubleshoot-db2d3e953.pdf.
"GNU Emacs Manual", dated Apr. 15, 2016, pp. 43-47. Retrieved from https://web.archive.org/web/20160415175915/http://www.gnu.org/software/emacs/manual/html_mono/emacs.html.
"Google Protocol RPC Library Overview", dated Apr. 27, 2016. Retrieved from https://cloud.google.com/appengine/docs/python/tools/protorpd/ (last accessed Jun. 16, 2016).
"IBM—What is HBase?", dated Sep. 6, 2015. Retrieved from https://web.archive.org/web/20150906022050/http://www-01.ibm.com/software/data/infosphere/hadoop/hbase/.
"IBM Informix TimeSeries data management", dated Jan. 18, 2016. Retrieved from https://web.archive.org/web/20160118072141/http://www-01.ibm.com/software/data/informix/timeseries/.
"IBM InfoSphere BigInsights 3.0.0—Importing data from and exporting data to DB2 by using Sqoop", dated Jan. 15, 2015. Retrieved from https://web.archive.org/web/20150115034058/http://www-01.ibm.com/support/knowledgecenter/SSPT3X_3.0.0/com.ibm.swg.im.infosphere.biginsights.import.doc/doc/data_warehouse_sqoop.html.
"Maximize Data Value with Very Large Database Management by SAP Sybase IQ", dated 2013. Retrieved from http://www.sap.com/bin/sapcom/en_us/downloadasset.2013-06-jun-11-11.maximize-data-value-with-very-large-database-management-by-sap-sybase-iq-pdf.html.
"Microsoft Azure—Managing Access Control Lists (ACLs) for Endpoints by using PowerShell", dated Nov. 12, 2014. Retrieved from https://web.archive.org/web/20150110170715/http://msdn.microsoft.com/en-us/library/azure/dn376543.aspx.
"Oracle Big Data Appliance—Perfect Balance Java API", dated Sep. 20, 2015. Retrieved from https://web.archive.org/web/20131220040005/http://docs.oracle.com/cd/E41604_01/doc.22/e41667/toc.htm.
"Oracle Big Data Appliance—X5-2", dated Sep. 6, 2015. Retrieved from https://web.archive.org/web/20150906185409/http://www.oracle.com/technetwork/database/bigdata-appliance/overview/bigdataappliance-datasheet-1883358.pdf.
"Oracle Big Data Appliance Software User's Guide", dated Feb. 2015. Retrieved from https://docs.oracle.com/cd/E55905_01/doc.40/e55814.pdf.
"SAP HANA Administration Guide", dated Mar. 29, 2016, pp. 290-294. Retrieved from https://web.archive.org/web/20160417053656/http://help.sap.com/hana/SAP_HANA_Administration_Guide_en.pdf.
"Sophia Database—Architecture", dated Jan. 18, 2016. Retrieved from https://web.archive.org/web/20160118052919/http://sphia.org/architecture.html.
"Tracking Data Changes", SQL Server 2008 R2, dated Sep. 22, 2015. Retreived from https://web.archive.org/web/20150922000614/https://technet.microsoft.com/en-us/library/bb933994(v=sql.105).aspx.
"Use Formula AutoComplete", dated 2010. Retrieved from https://support.office.com/en-us/article/Use-Formula-AutoComplete-c7c46fa6-3a94-4150-a217-34140c1ee4d9 (last accessed Jun. 16, 2016).
Adelfio et al. "Schema Extraction for Tabular Data on the Web", Proceedings of the VLDB Endowment, vol. 6, No. 6. Apr. 2013. Retrieved from http://www.cs.umd.edu/~hjs/pubs/spreadsheets-vldb13.pdf.
Advisory Action dated Apr. 19, 2017, in U.S. Appl. No. 15/154,999.
Advisory Action dated Apr. 20, 2017, in U.S. Appl. No. 15/154,980.
Advisory Action dated Apr. 6, 2017, in U.S. Appl. No. 15/154,995.
Advisory Action dated Dec. 21, 2017, in U.S. Appl. No. 15/154,984.
Advisory Action dated Mar. 31, 2017, in U.S. Appl. No. 15/154,996.
Advisory Action dated May 3, 2017, in U.S. Appl. No. 15/154,993.
Borror, Jefferey A. "Q for Mortals 2.0", dated Nov. 1, 2011. Retreived from http://code.kx.com/wiki/JB:QforMortals2/contents.
Breitbart, Update Propagation Protocols for Replicated Databases, SIGMOD '99 Philadelphia PA, 1999, pp. 97-108.
Cheusheva, Svetlana. "How to change the row color based on a cell's value in Excel", dated Oct. 29, 2011 Retrieved from https://www.ablebits.com/office-addins-blog/2013/10/29/excel-change-row-background-color/ (last accessed Jun. 16, 2016).
Corrected Notice of Allowability dated Aug. 9, 2017, in U.S. Appl. No. 15/154,980.
Corrected Notice of Allowability dated Jul. 31, 2017, in U.S. Appl. No. 15/154,999.
Corrected Notice of Allowability dated Mar. 10, 2017, in U.S. Appl. No. 15/154,979.
Corrected Notice of Allowability dated Oct. 26, 2017, in U.S. Appl. No. 15/610,162.
Decision on Pre-Appeal Conference Request dated Nov. 20, 2017, in U.S. Appl. No. 15/154,997.
Ex Parte Quayle Action dated Aug. 8, 2016, in U.S. Appl. No. 15/154,999.
Final Office Action dated Apr. 10, 2017, in U.S. Appl. No. 15/155,006.
Final Office Action dated Aug. 10, 2018, in U.S. Appl. No. 15/796,230.
Final Office Action dated Aug. 2, 2018, in U.S. Appl. No. 15/154,996.
Final Office Action dated Aug. 28, 2018, in U.S. Appl. No. 15/813,119.
Final Office Action dated Dec. 19, 2016, in U.S. Appl. No. 15/154,995.
Final Office Action dated Dec. 29, 2017, in U.S. Appl. No. 15/154,974.
Final Office Action dated Feb. 24, 2017, in U.S. Appl. No. 15/154,993.
Final Office Action dated Jan. 27, 2017, in U.S. Appl. No. 15/154,980.
Final Office Action dated Jan. 31, 2017, in U.S. Appl. No. 15/154,996.
Final Office Action dated Jul. 27, 2017, in U.S. Appl. No. 15/154,993.
Final Office Action dated Jun. 18, 2018, in U.S. Appl. No. 15/155,005.
Final Office Action dated Jun. 23, 2017, in U.S. Appl. No. 15/154,997.
Final Office Action dated Mar. 1, 2017, in U.S. Appl. No. 15/154,975.
Final Office Action dated Mar. 13, 2017, in U.S. Appl. No. 15/155,012.
Final Office Action dated Mar. 31, 2017, in U.S. Appl. No. 15/155,005.
Final Office Action dated May 15, 2017, in U.S. Appl. No. 15/155,010.
Final Office Action dated May 18, 2018, in U.S. Appl. No. 15/654,461.
"Definition of Multicast" by Lexico powered by Oxford at https://www.lexico.com/en/definition/multicast, 2019, p. 1.

(56) References Cited

OTHER PUBLICATIONS

"What is a Key-Value Database?" at https://database.guide/what-is-a-key-value-database, Database Concepts, NOSQL, 2019 Database.guide, Jun. 21, 2016, pp. 1-7.

* cited by examiner

```
t1 = db.table1
t2 = t1.someOp1()
t3 = t1.someOp2()
```
FIG. 4A
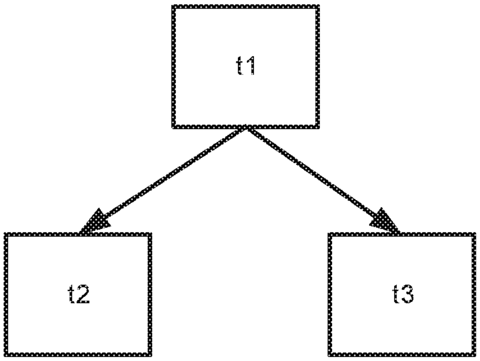
FIG. 4B
```
t1 = db.table1
t2 = t1.someOp1()
t3 = t1.someOp2()
t4 = t3.join(t2)
```
FIG. 5A
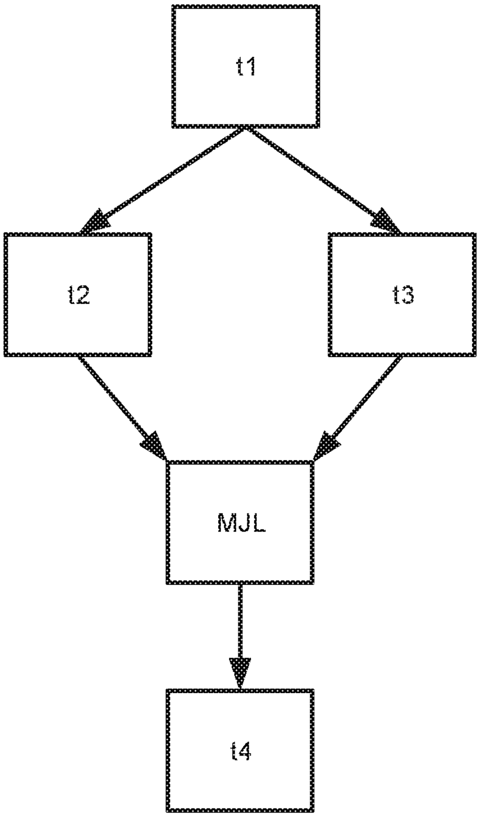
FIG. 5B
| Listener | Priority |
|---|---|
| t1 | P1 |
| t2 | P2 |
| t3 | P3 |
| MJL | P4 |
| t4 | P5 |
FIG. 5C

```
t1 = db.table1
t2 = t1.someOp1()
t3 = t1.someOp2()
t4 = t3.joinOp1(t2)
t5 = t3.joinOp2(t2)
t6 = t5.joinOp3(t4)
```
FIG. 11A
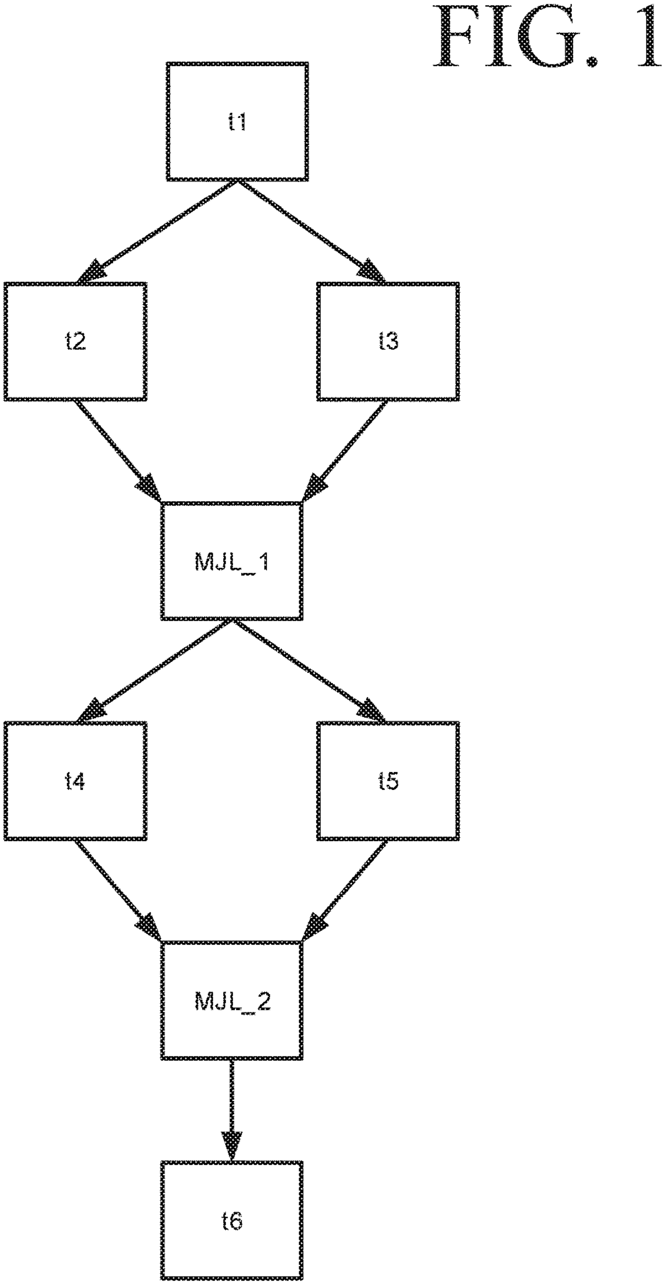
FIG. 11B
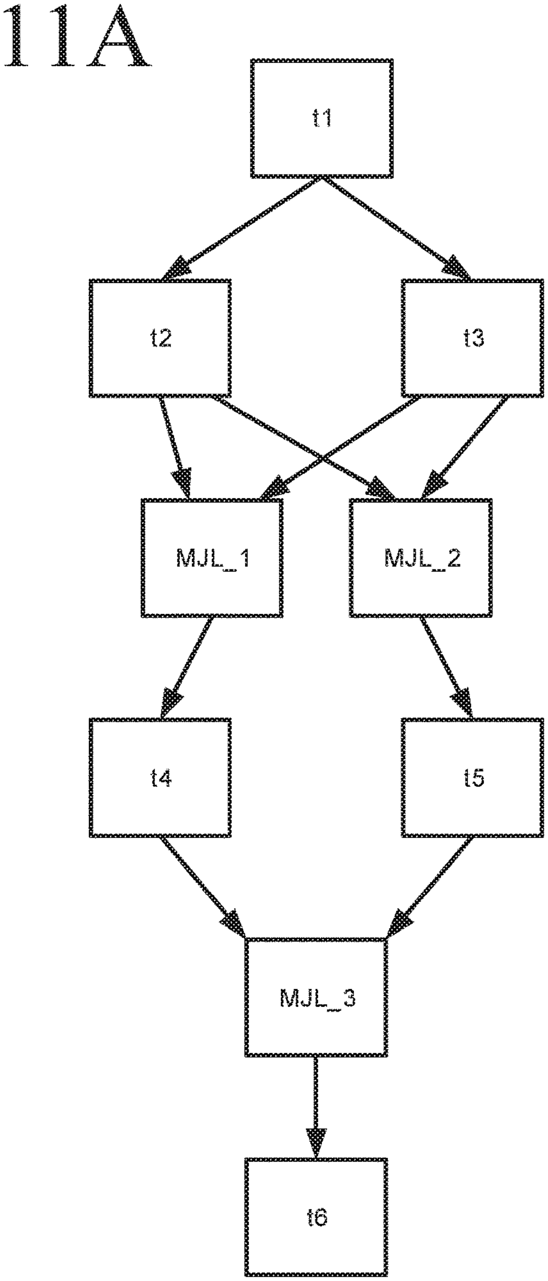
FIG. 11C

COMPUTER DATA SYSTEM DATA SOURCE REFRESHING USING AN UPDATE PROPAGATION GRAPH HAVING A MERGED JOIN LISTENER

This application claims the benefit of U.S. Provisional Application No. 62/549,908, entitled "COMPUTER DATA SYSTEM" and filed on Aug. 24, 2017, which is incorporated herein by reference in its entirety.

Embodiments relate generally to computer data systems, and more particularly, to methods, systems and computer readable media for data source join refreshing.

Data sources or objects within a computer data system may include static sources and dynamic sources. Some data sources or objects (e.g., tables) may depend on other data sources. As new data is received or obtained for dynamic data sources, those dynamic data sources may be refreshed (or updated). Data sources or objects that are dependent on one or more dynamic sources that have been refreshed may also need to be refreshed. The refreshing of data sources may need to be performed in an order based on dependencies to update join operations in a consistent and/or efficient manner.

Embodiments were conceived in light of the above mentioned needs, problems and/or limitations, among other things.

Some implementations (first implementations) include a system for updating a data object using update propagation graphs and merged join listeners to determine consistent join update processing. The system can include one or more hardware processors coupled to a nontransitory computer readable medium having stored thereon software instructions that, when executed by the one or more processors, cause the one or more processors to perform operations. The operations can include receiving a request to perform a join operation on a plurality of objects. The operations can also include creating an update propagation graph (UPG) for propagating updates to a result of the join operation. The operations can further include adding a merged join listener to the UPG as a child of the plurality of objects. The operations can also include adding a join result structure to the UPG as a child of the merged join listener. The operations can further include propagating updates through the UPG, including the merged join listener combining update notifications from the plurality of objects for a given update clock cycle into a merged notification and delivering the merged notification to the join result structure's node of the UPG during that clock cycle to provide a consistent representation of updates to all sides of the join operation to the join result structure node. The merged join listener combining can include, for each current notification received at the merged join listener during the given update clock cycle, determining whether a priority queue includes an existing notification from the merged notification listener for the given clock cycle. The combining can also include, when the priority queue includes an existing notification from the merged notification listener for the given clock cycle, updating, responsive to the determining, the existing notification to include an additional notification based on the current notification. The combining can further include, when the priority queue does not include an existing notification from the merged notification listener for the given clock cycle, adding a new notification to the priority queue based on the current notification. The operations can also include receiving the merged notification at the join result structure node and applying changes to update the result of the join operation in a consistent manner without having to re-execute the full join operation.

In some first implementations, the plurality of objects are tables. In some first implementations, the join result structure is a table. In some first implementations, the UPG is directed acyclic graph (DAG). In some first implementations, the plurality of objects consists of three or more objects.

In some first implementations, the operations also include adding a second join result structure to the UPG as a second child of the merged join listener. In some first implementations, the operations further include receiving a second merged notification at the second join result structure's node of the UPG. In some first implementations, the join result structure comprises a plurality of matrices. In some first implementations, the join operation is an outer join, an inner join, and/or a cross join.

Some implementations (second implementations) can include a method that includes receiving, at a query processor, a request to perform a join operation on a plurality of objects. The method can also include creating, at the query processor, an update propagation graph (UPG) for propagating updates to a result of the join operation. The method can further include adding a merged join listener to the UPG as a child of the plurality of objects. The method can also include adding a join result to the UPG as a child of the merged join listener. The method can further include propagating updates through the UPG, including the merged join listener combining update notifications from the plurality of objects for a given update clock cycle into a merged notification and delivering the merged notification to the join result's node of the UPG during that clock cycle to provide a consistent representation of updates to all sides of the join operation to the join result node. The method can also include receiving the merged notification at the join result node and applying changes to update the result of the join operation in a consistent manner without having to re-execute the full join operation.

In some second implementations, the plurality of objects consists of a plurality of tables. In some second implementations, the UPG is a directed acyclic graph (DAG).

In some second implementations, the merged join listener combining update notifications from the plurality of objects for a given update clock cycle into a merged notification includes receiving a notification during the given update clock cycle, determining that a priority queue includes an existing notification from the merged notification listener for the given clock cycle, and updating, responsive to the determining, the existing notification to include an additional notification based on the received notification.

In some second implementations, the merged join listener combining update notifications from the plurality of objects for a given update clock cycle into a merged notification includes receiving a notification during the given update clock cycle, determining that the priority queue does not include an existing notification from the merged notification listener for the given clock cycle, and adding, responsive to the determining, a new notification from the merged notification listener to the priority queue based on the received notification.

In some second implementations, the merged join listener combining update notifications from the plurality of objects for a given update clock cycle into a merged notification further includes receiving a second notification during the given update clock cycle, determining that the priority queue includes an existing notification from the merged notification listener for the given clock cycle, the existing notification being the new notification, and updating, responsive to the determining, the existing notification to include an additional notification based on the second notification.

In some second implementations, the method also includes adding a second join result structure to the UPG as a second child of the merged join listener. In some second implementations, the method further includes receiving a second merged notification at the second join result structure's node of the UPG. In some second implementations, the second merged notification is a copy of the merged notification. In some second implementations, the join result structure comprises a plurality of matrices. In some second implementations, the join operation can be an outer join, an inner join, and/or a cross join.

Some implementations (third implementations) include a nontransitory computer readable medium having stored thereon software instructions that, when executed by one or more processors, cause the one or more processors to perform operations. The operations can include receiving a request to perform a join operation on a plurality of objects. The operation can also include creating an update propagation graph (UPG) for propagating updates to a result of the join operation. The operations can further include adding a merged join listener to the UPG as a child of the plurality of objects. The operations can also include adding a join result structure to the UPG as a child of the merged join listener. The operations can further include propagating updates through the UPG, including the merged join listener combining update notifications from the plurality of objects for a given update clock cycle into a merged notification and delivering the merged notification to the join result structure's node of the UPG during that clock cycle to provide a consistent representation of updates to all sides of the join operation to the join result structure node. The operations can also include receiving the merged notification at the join result structure node and applying changes to update the result of the join operation in a consistent manner without having to re-execute the full join operation.

In some third implementations, the plurality of objects are tables and the join result structure is a table. In some third implementations, the UPG is a directed acyclic graph (DAG). In some third implementations, the plurality of objects consists of three or more objects. In some third implementations, the operations also include adding a second join result structure to the UPG as a second child of the merged join listener.

In some third implementations, the merged join listener combining update notifications from the plurality of objects for a given update clock cycle into a merged notification includes, for each current notification received at the merged join listener during the given update clock cycle: determining whether a priority queue includes an existing notification from the merged notification listener for the given clock cycle. In such third implementations, the combining also includes, when the priority queue includes an existing notification from the merged notification listener for the given clock cycle, updating, responsive to the determining, the existing notification to include an additional notification based on the current notification. In such third implementations, the combining further includes, when the priority queue does not include an existing notification from the merged notification listener for the given clock cycle, adding a new notification to the priority queue based on the current notification.

In some third implementations, the join result structure comprises a plurality of matrices. In some third implementations, the join operation can be an outer join, an inner join, and/or a cross join.

Some implementations (fourth implementations) include a system that includes one or more hardware processors coupled to a nontransitory computer readable medium having stored thereon software instructions that, when executed by the one or more processors, cause the one or more processors to perform operations. The operations can include receiving a request to perform a join operation on a plurality of data sources. The operations can also include creating an update propagation graph (UPG) for propagating updates to a result of the join operation. The operations can further include adding a merged join listener to the UPG as a child of the plurality of objects. The operations can also include adding a join result structure to the UPG as a child of the merged join listener. The operations can further include propagating updates through the UPG, including the merged join listener combining update notifications from the plurality of objects for a given update clock cycle into a merged notification and delivering the merged notification to the join result structure's node of the UPG during that clock cycle to provide a consistent representation of updates to all sides of the join operation to the join result structure node. The operations can also include receiving the merged notification at the join result structure node and applying changes to update the result of the join operation in a consistent manner without having to re-execute the full join operation.

In some fourth implementations, the join result structure is a table. In some fourth implementations, the UPG is a directed acyclic graph (DAG). In some fourth implementations, the plurality of data sources consists of three or more data sources.

In some fourth implementations, the operations also include adding a second join result structure to the UPG as a second child of the merged join listener. In some fourth implementations, the operations further include receiving a second merged notification at the second join result structure's node of the UPG. In some fourth implementations, the join result structure comprises a plurality of matrices. In some fourth implementations, the join operation can be outer join, an inner join, and/or a cross join.

BRIEF DESCRIPTION OF THE DRAWINGS

FIGS. 4A and 4B show data source definitions and a corresponding directed acyclic graph (DAG) in accordance with some implementations.

FIGS. 5A and 5B show data source definitions and a corresponding DAG in accordance with some implementations.

FIG. 5C is a table showing the priorities assigned to the nodes of the DAG in FIG. 5B in accordance with some implementations.

FIGS. 11A and 11B show data source definitions and a corresponding DAG in accordance with some implementations.

FIG. 11C shows a DAG corresponding to the data source definitions shown in FIG. 11A in accordance with some implementations.

DETAILED DESCRIPTION

Reference may be made herein to the Java programming language, Java classes, Java bytecode and the Java Virtual Machine (JVM) for purposes of illustrating example implementations. It will be appreciated that implementations can include other programming languages (e.g., groovy, Scala, R, Go, etc.), other programming language structures as an alternative to or in addition to Java classes (e.g., other language classes, objects, data structures, program units, code portions, script portions, etc.), other types of bytecode, object code and/or executable code, and/or other virtual machines or hardware implemented machines configured to execute a data system query.

Figure 1:
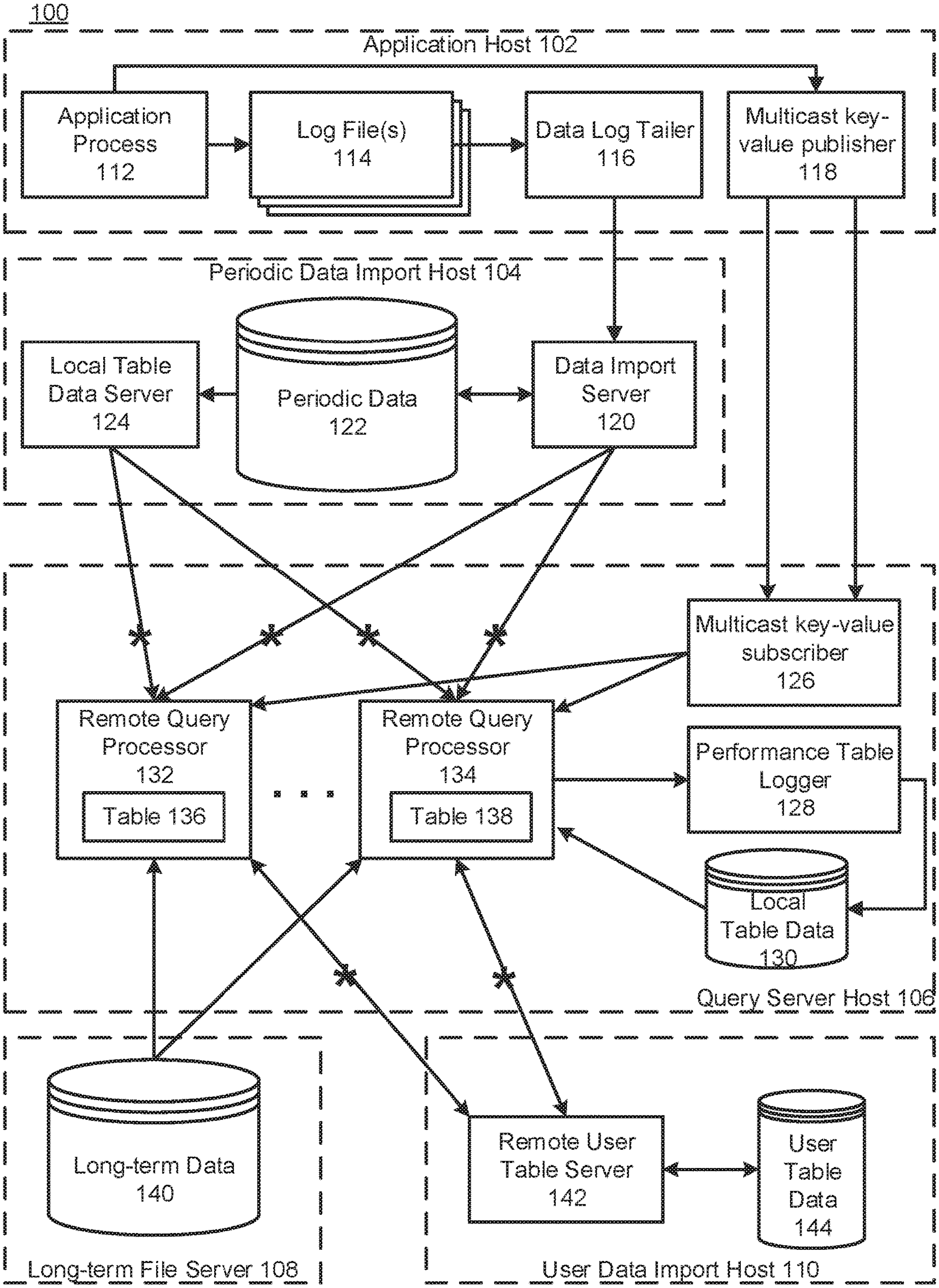
FIG. 1 is a diagram of an example computer data system showing an example data distribution configuration in accordance with some implementations.
Figure 2:
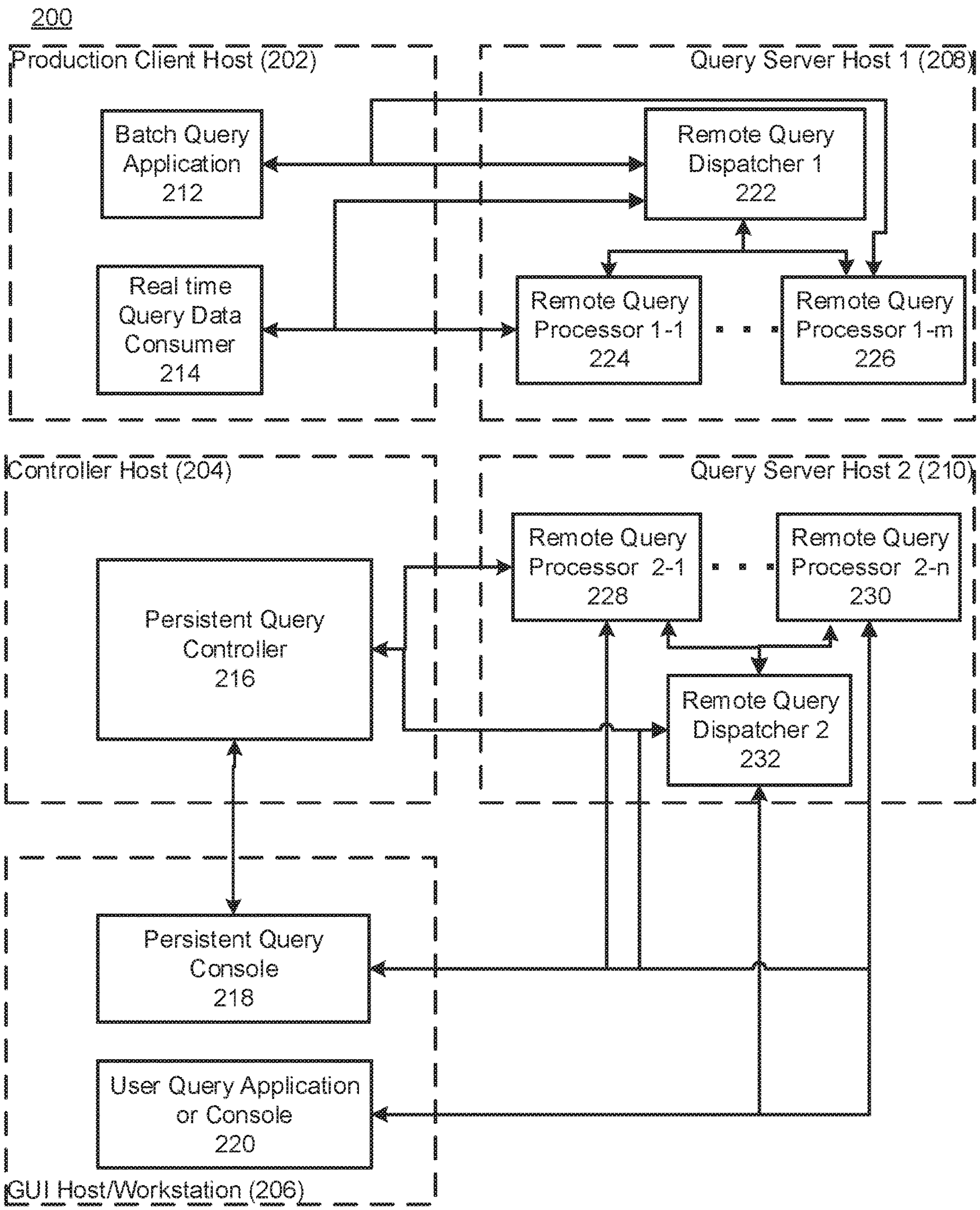
FIG. 2 is a diagram of an example computer data system showing an example administration/process control arrangement in accordance with some implementations.

FIG. 1 is a diagram of an example computer data system and network 100 showing an example data distribution configuration in accordance with some implementations. In particular, the system 100 includes an application host 102, a periodic data import host 104, a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( ) statement execution, for example. A TableMap object can be the result of a byExternal( ) statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log tailers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to be limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118). Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol, the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as a remote query processor (132, 134), then the data may be persisted in some fashion (e.g., written to disk).

The local table data server 124 can be configured to retrieve data stored in the periodic table data store 122 and provide the retrieved data to one or more remote query processors (132, 134) via an optional proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS, for example.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors. Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries. For example, a user can submit a query to 216, and 216 starts and runs the query every day. In another example, a securities trading strategy could be a persistent query. The persistent query controller can start the trading strategy query every morning before the market opened, for instance. It will be appreciated that 216 can work on times other than days. In some implementations, the controller may require its own clients to request that queries be started, stopped, etc. This can be done manually, or by scheduled (e.g., cron) jobs. Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

Figure 3:
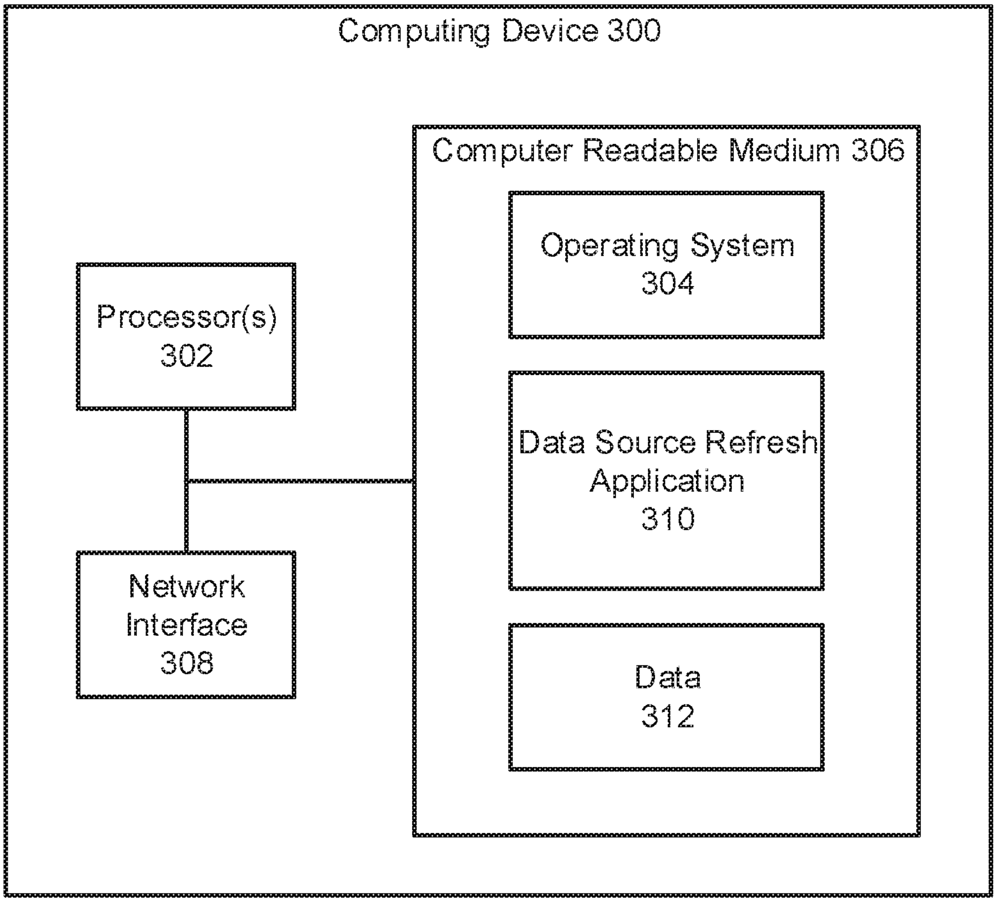
FIG. 3 is a diagram of an example computing device configured for GUI control element processing in accordance with some implementations.

FIG. 3 is a diagram of an example computing device 300 in accordance with at least one implementation. The computing device 300 includes one or more processors 302, operating system 304, computer readable medium 306 and network interface 308. The memory 306 can include a data source refresh application 310 and a data section 312 (e.g., for storing DAGs, etc.).

In operation, the processor 302 may execute the application 310 stored in the memory 306. The application 310 can include software instructions that, when executed by the processor, cause the processor to perform operations for data source refreshing in accordance with the present disclosure (e.g., performing one or more of 602-622, 702-718, 802-812, 902-920, and/or 1002-1012 described below).

The application program 310 can operate in conjunction with the data section 312 and the operating system 304.

FIGS. 4A and 4B show data source definitions and a corresponding directed acyclic graph (DAG) in accordance with some implementations. In FIG. 4A, example code defines the data sources as tables (t1-t3). From the code for the data sources, a DAG can be generated as shown by the graph in FIG. 4B. The DAG in FIG. 4B shows dependencies between the nodes, which correspond to table data sources.

Data sources can include market data (e.g., data received via multicast distribution mechanism or through a tailer), system generated data, historical data, user input data from the remote user table server, tables programmatically generated in-memory, or something further upstream in the DAG. In general, anything represented in the data system (e.g., an object, a table) and which can refresh itself/provide data can be a data source. Also, data sources can include non-table data structures which update, for example, mathematical data structures. As shown in FIG. 4A, t3=t1.someOp2( ), where "t1.someOp2( )" represents an operation performed with respect to t1 such as, for example, "t1.svd( )", where this takes the singular value decomposition of table t1. The SVD would then get updated when t1 changes. The SVD can be represented as a collection of matrices and is an example of a non-tabular result. Similarly, correlation matrices, linear algebra, PDE solvers, a non-matrix, non-tabular data object, etc. can be supported.

In some implementations, code can be converted into the in-memory data structures holding the DAG. For example, the source code of FIG. 4A gets converted into the DAG data structure in memory. The DAG connectivity can change by executing code. For example, assume a set of code CODE1 is executed. CODE1 leads to a DAG1 being created. Data can be processed through DAG1, leading to table updates. Now assume that the user wants to compute a few more tables. The user can run a few more lines of code CODE2, which use variables computed in CODE1. The execution of CODE2 leads to a change in the DAG. As a simple example, assume that the first 3 lines in FIG. 4A are executed. The user could come along later and execute line 4, which would modify the DAG data structure. Also, some implementations can permit other programs to listen to changes from a node representing a data object (e.g., table or non-table object) or an internal node.

In some implementations, when a table changes, an application programming interface (API) can specify rows where add, modify, delete, or reindex (AMDR) changes were made. A reindex is a change in which a row is moved but the value contained in the row is not modified. The API can also provide a mechanism to obtain a value prior to the most recent change. When the DAG is processed during the refresh, the AMD info on "upstream" data objects (e.g., tables, etc.) or nodes is used to compute changes in "downstream" data objects or nodes. In some implementations, the entire DAG can be processed during the refresh cycle.

In general, a DAG can be comprised of a) dynamic nodes (DN); b) static nodes (SN); and c) internal nodes (IN) that can include nodes with DN and/or SN and/or IN as inputs.

DNs are nodes of the graph that can change. For example, DN can be data sources that update as new data comes in. DN could also be timers that trigger an event based on time intervals. In other examples, DN could also be MySQL monitors, specialized filtering criteria (e.g., update a "where" filter only when a certain event happens). Because these nodes are "sources", they may occur as root nodes in the DAG. At the most fundamental level, DN are root DAG nodes which change (e.g., are "alive").

SNs are nodes of the DAG that do not change. For example, historical data does not change. IN are interior nodes of the DAG. The state of an IN can be defined by its inputs, which can be DN, SN, and or IN. If all of the IN inputs are "static", the IN will be static. If one or more of the IN inputs is "dynamic", the IN will be dynamic. IN can be tables or other data structures. For example, a "listener IN" can permit code to listen to a node of the DAG. A listener node or associated listener monitoring code can place (or "fire") additional events (or notifications) into a priority queue of a DAG.

In general, a DAG can be composed of static and/or dynamic subgraphs. Update processing occurs on dynamic subgraphs (because static subgraphs are not changing). Only dynamic nodes are in the DataMonitor loop. For Tables, AMDR messages are used for communication within the DAG.

When query code is executed, the DAG is created or modified. As part of this process, the system records the order in which the DAG nodes were constructed in. This "construction ordering" can be used to determine the order that nodes are processed in the DAG.

For example, consider:

a=db.i( . . . ), where a is a dynamic node (or DN)
b=a.where("A=1")
c=b.where("B=2")
d=c.join(b)

Assume (a) has changes to be processed during a refresh cycle. The order of processing will be (a), (b), (c), and then (d).

When (d) is processed, it will process input changes from both (b) and (c) before creating AMDRs notification messages for (d). This ordering prevents (d) from creating more than one set of AMDRs per input change, and it can help ensure that all AMDRs are consistent with all data being processed for the clock cycle. If this ordering were not in place, it may be possible to get multiple ticks per cycle and some of the data can be inconsistent. Also, the ordering can help ensure that joins produce consistent results.

FIGS. 5A and 5B show data source definitions and a corresponding DAG in accordance with some implementations. In particular, the code of FIG. 5A defines the data sources as tables (t1-t4). From the code for the data sources, a DAG can be generated as shown by the graph in FIG. 5B. The DAG in FIG. 5B shows dependencies between the nodes, which correspond to table data sources. In particular, FIG. 5B shows an example in which a merged join listener MJL is added to the DAG when the join operation (the fourth line of code) in FIG. 5A is executed.

FIG. 5C is a table showing the priorities assigned to the nodes of the DAG in FIG. 5B in accordance with some implementations. In some embodiments, the system records the order in which the DAG nodes were constructed in and uses this "construction ordering" to determine node priorities. In some embodiments, the system can assign the priorities of the nodes after the DAG has been constructed based on the arrangement of nodes within the DAG. The priorities are can be used to determine the order that nodes are processed in the DAG as discussed below (e.g., at 702 in FIG. 7, and at 802-812 in FIG. 8).

It will be appreciated that a join operation can have two or more inputs and one or more outputs, and when generating a DAG a merged join listener node in the DAG can have two or more parent nodes (the two or more inputs to the join operation) and one or more child nodes (the one or more outputs/results of the join operation). For example, in some embodiments, by processing notifications through the DAG based on priorities (e.g., the construction ordering or priority as shown, for example, in FIG. 5C) a merged join listener can process notifications from two or more parent nodes as shown in FIGS. 6 and 7, and discussed below.

Figure 6:
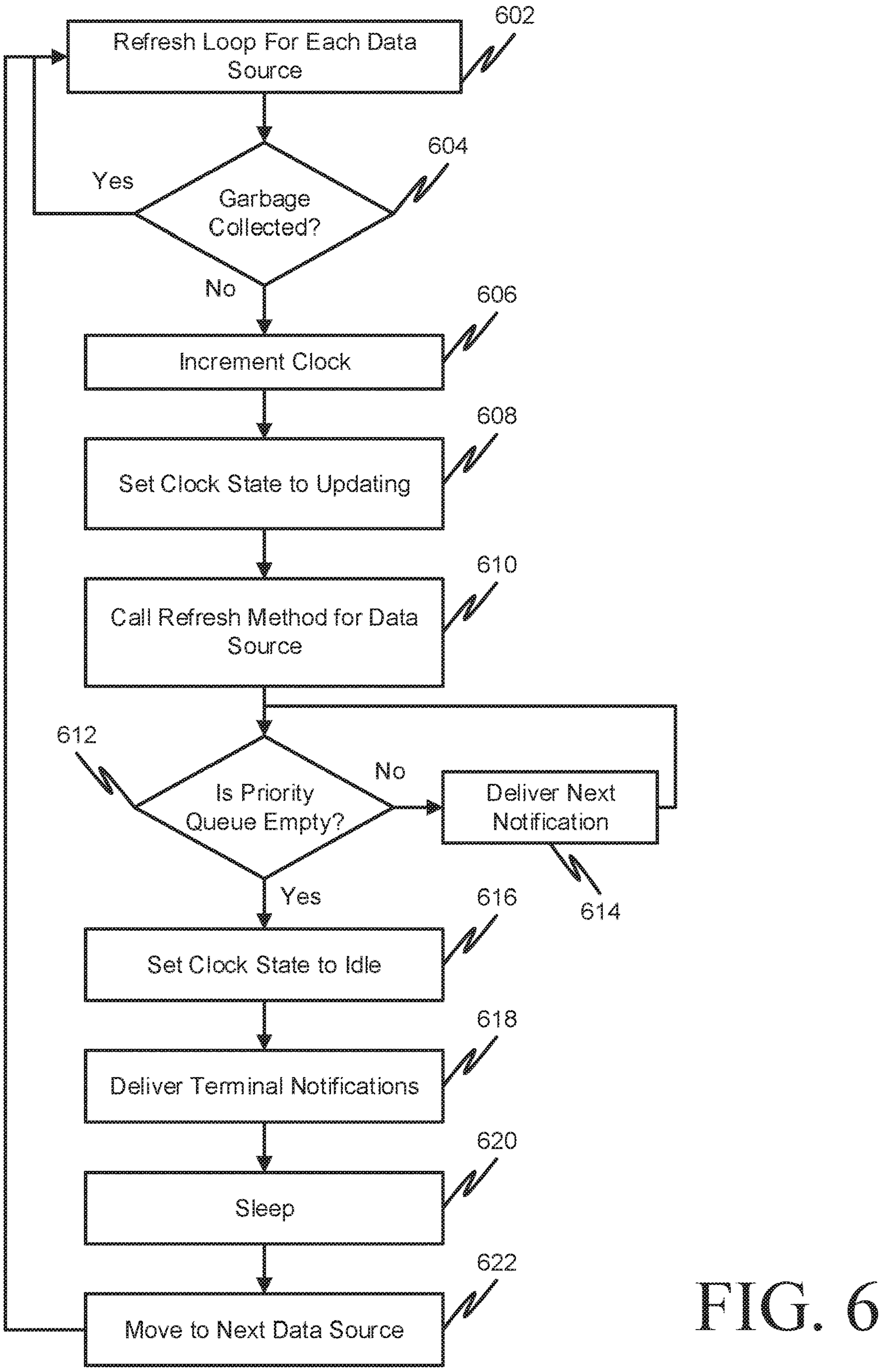
FIG. 6 is a flowchart of an example data source refresh process in accordance with some implementations.
Figure 7:
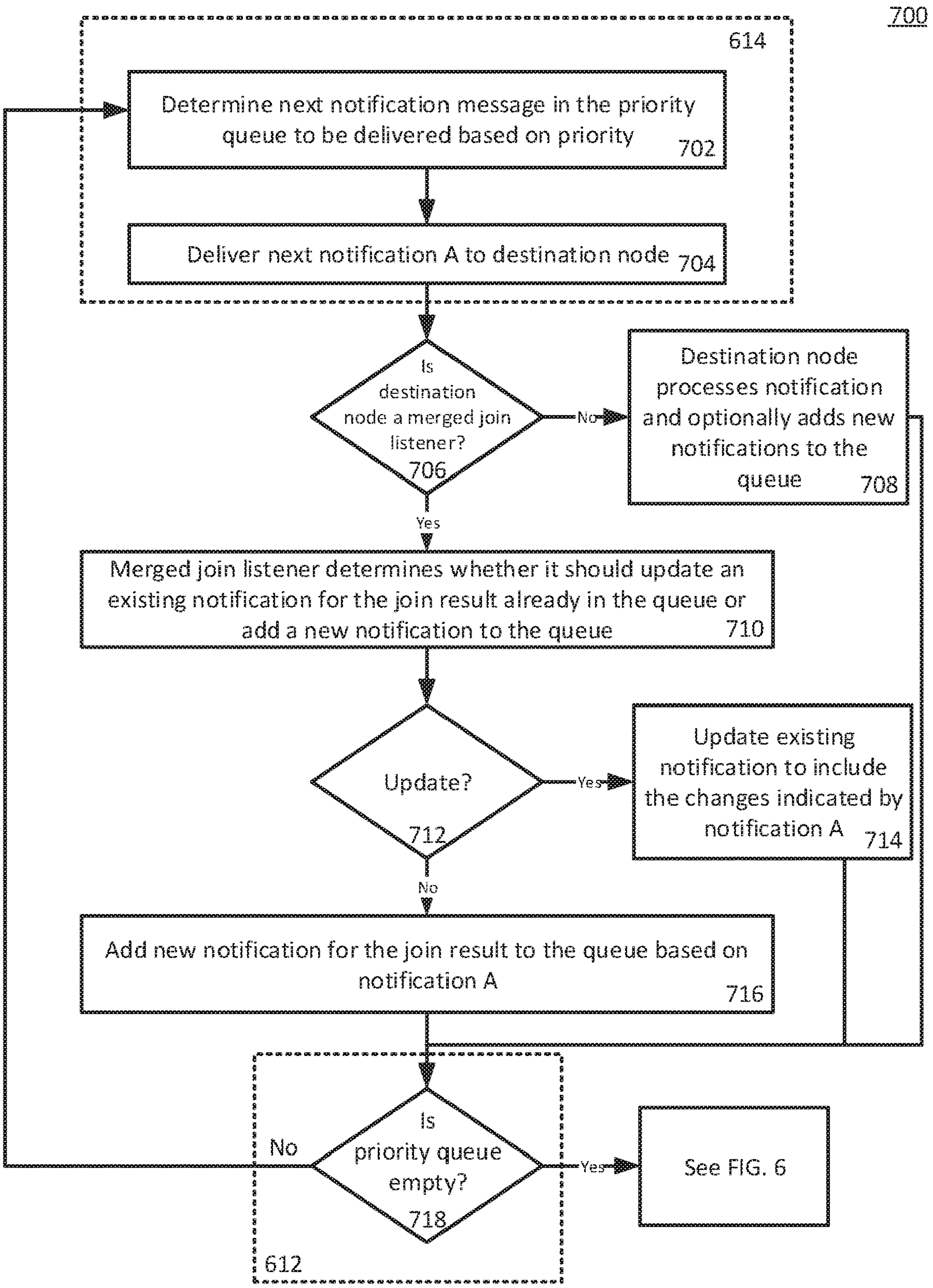
FIG. 7 is a flowchart of an example merged join listener process in accordance with some implementations.

FIG. 6 is a flowchart of an example data source refresh process in accordance with some implementations. Processing begins at 602, where a refresh loop for each data source begins. Processing continues to 604.

At 604, the system determines whether the data source has been (or should be) garbage collected. In some implementations, a DAG can use garbage collection to determine when parts of the evolving DAG are no longer needed. This can help ensure referential integrity. To accomplish this, nodes upstream have hard links, while nodes downstream have weak links. As a result of this, children prevent parents from being garbage collected, but parents allow children to be garbage collected. Processing continues to 606.

At 606, a logical clock value (or count) is incremented. In some implementations, the clock has a few uses. One example use is to control how the data is bunched and processed. The logical clock may be used to determine whether data may have changed for producing asynchronous consistent snapshots. Another example is that the logical clock may indicate whether certain data is up-to-date or needs to be recomputed. Processing continues to 608.

At 608, the logical clock state is set to updating. The updating state of the logical clock can be a signal to indicate that an update or refresh cycle of the data sources is in progress. Processing continues to 610.

At 610, a refresh method is called for the data source. Processing continues to 612.

At 612, the system determines whether the priority queue is empty. The priority queue can include a data type similar to a regular queue or stack data structure, where each element has a "priority" associated with it. In a priority queue, an element with high priority is served before an element with low priority. If two elements have the same priority, they are served according to their order in the queue. In some implementations, priority can be based upon DAG position. AMDR messages can include concise summaries of what changed in a table (e.g., data added, modified, deleted, or reordered). The AMDR messages also allow the values at the previous clock cycle to be seen. If the queue is not empty, processing continues to 614. Otherwise, processing continues to 616.

At 614, the next notification from the queue is delivered. Processing continues back to 612.

At 616, the logical clock state is set to idle to indicate the end of the refreshing for this data source. Processing continues to 618.

At 618, terminal notifications are delivered. In some implementations, terminal notifications can include notifications that (1) are processed last and (2) don't have side effects on other nodes and/or data sources. Processing continues to 620.

At 620, the system sleeps. Some implementations can include fixed period clock cycles (e.g., 1 second), but other strategies can work. Some implementations may not sleep, but rather immediately go on and process the next bunch of data. Processing continues to 622.

At 622, the system moves to the next data source and processing continues to 602.

FIG. 7 is a flowchart of an example merged join listener process 700 in accordance with some implementations. Processing begins at 702, where the next notification message in the priority queue to be delivered is determined based on priority. For example, some embodiments use a priority queue such as priority queue 814 shown in FIG. 8 and discussed below. to Processing continues to 704.

At 704, notification A is delivered to destination node. Processing continues to 706.

At 706, it is determined whether the destination node is a merged join listener. If so, processing continues to 710, otherwise processing continues to 708.

At 708, the destination node processes the notification. Optionally, the destination node can add new notifications to the queue. Processing continues to 718.

At 710, the merged join listener determines whether it should update an existing notification for the join result already in the queue or add a new notification to the queue. Processing continues to 712.

At 712, if the merged join listener determines that it should update an existing notification for the join result already in the queue, then processing continues to 714, otherwise processing continues to 716.

At 714, an existing notification in the queue is updated to include the changes indicated by notification A. Processing continues to 718.

At 716, a new notification for the join result is added to the queue based on notification A. Processing continues to 718.

At 718, the system determines whether the priority queue is empty. If it is empty, processing continues to 616, as shown in FIG. 6 and described above. Otherwise, processing continues to 702.

It will be appreciated that process 700 can be repeated in whole or in part to, for example, continue processing updates through the DAG.

Figure 8:
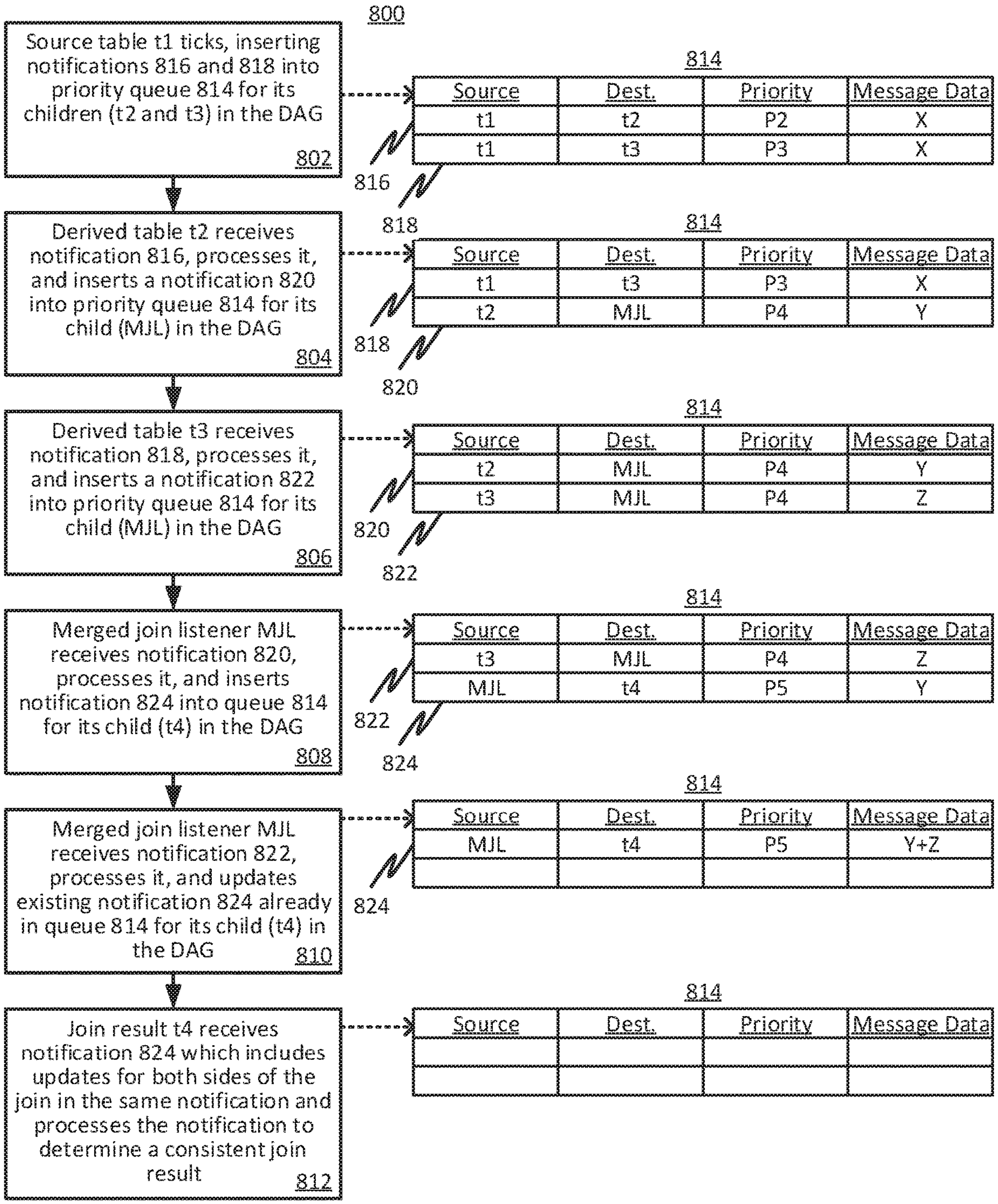
FIG. 8 is a flowchart showing example data source refresh processing of the DAG of FIG. 5B using a merged join listener and a priority queue, in accordance with some implementations.

FIG. 8 is a flowchart showing example data source refresh processing 800 of the DAG of FIG. 5B using a merged join listener and a priority queue 814, in accordance with some implementations. Processing begins at 802, where source table t1 ticks, inserting notifications 816 and 818 into priority queue 814 for its children (t2 and t3) in the DAG. Processing continues to 804.

At 804, derived table t2 receives notification 816, processes it, and inserts a notification 820 into priority queue 814 for its child (MJL) in the DAG. Processing continues to 806.

At 806, derived table t3 receives notification 818, processes it, and inserts a notification 822 into priority queue 814 for its child (MJL) in the DAG. Processing continues to 808.

At 808, merged join listener MJL receives notification 820, processes it, and inserts notification 824 into queue 814 for its child (t4) in the DAG. Processing continues to 810.

At 810, merged join listener MJL receives notification 822, processes it, and updates existing notification 824 already in queue 814 for its child (t4) in the DAG. Processing continues to 812.

At 812, join result t4 receives merged notification 824 which includes updates for both sides of the join in the same notification and processes the notification to determine a consistent join result. The merged join listener MJL ensures that join result t4 receives notifications from all sides of the join in the same merged notification, thereby allowing join result t4 to safely determine a consistent join result each time it receives a notification.

It will be appreciated that process 800 can be repeated to, for example, process another update through the DAG. It will also be appreciated that in some examples, less than all sides of the join insert a notification into the priority queue and in such examples the merged join listener will merge the notification(s) from those side(s) of the join that generated a notification into one merged notification to be delivered to the join result.

Figure 9:
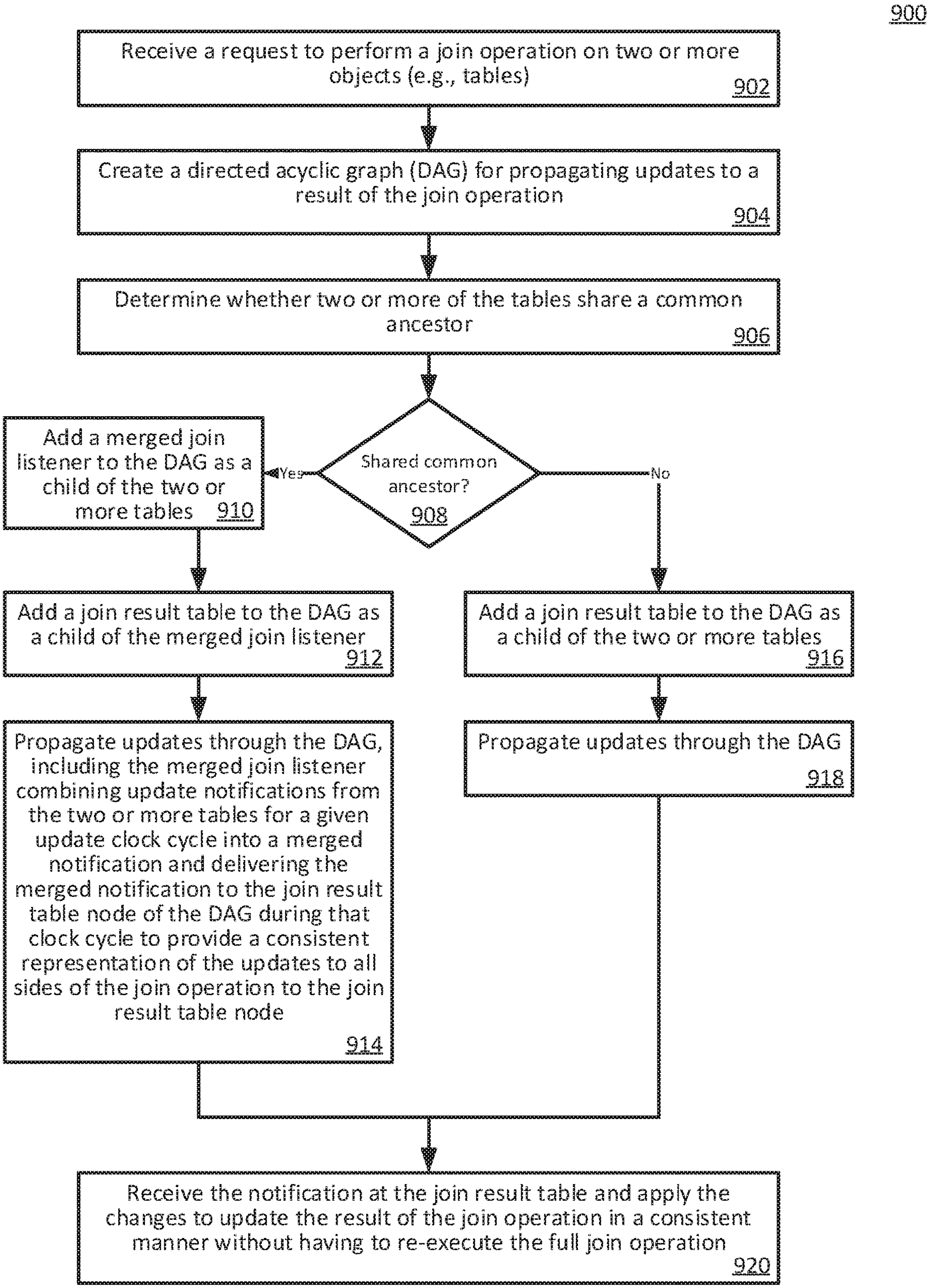
FIG. 9 is a flowchart of an example data source refresh process using an update propagation graph having a merged join listener process in accordance with some implementations.

FIG. 9 is a flowchart of an example data source refresh process 900 using an update propagation graph having a merged join listener in accordance with some implementations. Processing begins at 902, where, a request to perform a join operation on two or more objects (e.g., tables) is received. Processing continues to 904.

At 904, an update propagation graph such as, for example, a directed acyclic graph (DAG) is created for propagating updates to a result of the join operation. Processing continues to 906.

At 906, the system determines whether two or more of the tables share a common ancestor. Processing continues to 908.

At 908, if two or more of the tables shared common ancestor processing continues to 910, otherwise processing continues to 916.

At 910, a merged join listener is added to the DAG as a child of the two or more tables. Processing continues to 912.

At 912, a join result table is added to the DAG as a child of the merged join listener. Processing continues to 914.

At 914, updates are propagated through the DAG, including the merged join listener combining all update notifications from the two or more tables for a given update clock cycle into one merged notification and delivering the merged notification to the join result table node of the DAG during that clock cycle to provide a consistent representation of the updates to all sides of the join operation to the join result table node. Processing continues to 920.

At 916, a join result table is added to the DAG as a child of the two or more tables. Processing continues to 918.

At 918, updates are propagated through the DAG.

At 920, a notification is received at the join result table and the changes are applied to update the result of the join operation in a consistent manner without having to re-execute the full join operation. If any two sides of the join are based on a common source, the merge join listener ensures that the join result receives a merged notification that includes all the notifications from all of the sides of the join that have generated a notification. In some embodiments, the notifications can be AMDR messages and the merged notification can include multiple AMDR messages combined into one notification.

It will be appreciated that process 900 can be repeated in whole or in part to, for example, process additional updates through the DAG.

Figure 10:
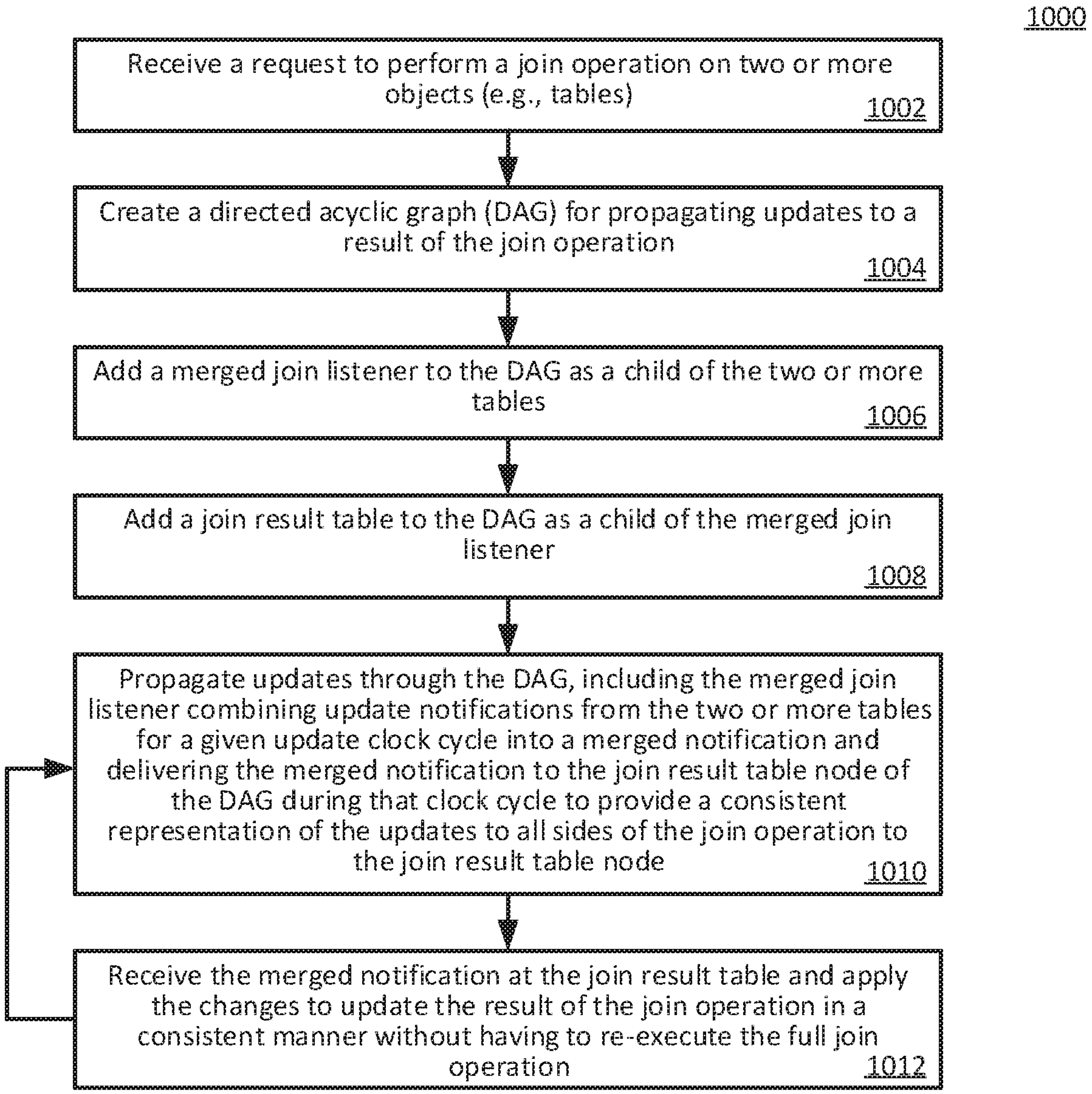
FIG. 10 is a flowchart of an example data source refresh process using an update propagation graph having a merged join listener process in accordance with some implementations.

FIG. 10 is a flowchart of an example data source refresh process 1000 using an update propagation graph having a merged join listener in accordance with some implementations. Processing begins at 1002, where a request to perform a join operation on two or more objects (e.g., data sources, tables or non-tabular structures, etc.) is received. Processing continues to 1004.

At 1004, an update propagation graph (UPG) such as, for example, a directed acyclic graph (DAG), is created for propagating updates to a result of the join operation. The join operation can be an operation that operates on two or more inputs and produces one or more outputs. For example, the join operation can be an outer join, an inner join, or a cross join. Processing continues to 1006.

At 1006, a merged join listener is added to the UPG as a child of the two or more objects. Processing continues to 1008.

At 1008, a join result structure is added to the UPG as a child of the merged join listener. Processing continues to 1010. For example, the join result structure can be an object such as a table or a non-tabular structure (e.g., a collection of matrices in the case of an SVD operation, as discussed above).

At 1010, updates are propagated through the UPG, including the merged join listener combining update notifications from the two or more objects for a given update clock cycle into a merged notification and delivering the merged notification to the join result structure's node of the UPG during that clock cycle to provide a consistent representation of the updates to all sides of the join operation to the join result structure node. For example, the merged join listener can combine all update notifications from the two or more objects for a given update clock cycle into one merged notification.

In some embodiments, the combining can include, for each current notification received at the merged join listener during the given update clock cycle, determining whether a priority queue includes an existing notification from the merged notification listener for the given clock cycle; and when it does, updating the existing notification to include an additional notification based on the current notification; and when it doesn't, adding a new notification to the priority queue based on the current notification. Processing continues to 1012.

At 1012, the merged notification is received at the join result table and the changes indicated therein are applied to update the result of the join operation in a consistent manner without having to re-execute the full join operation. In embodiments, when any two sides of the join are based on a common source, the merge join listener ensures that the join result receives one merged notification per logical clock cycle that includes all the notifications from all of the sides of the join that have generated a notification for that logical clock cycle, thereby enabling the system to update the result of the join operation in a consistent manner without having to re-execute the full join operation.

It will be appreciated that process 1000 can be repeated in whole or in part to, for example, process additional updates through the DAG.

It will also be appreciated that, although not shown, process 1000 can include adding a second join result object to the DAG.

In some embodiments, the notifications can be AMDR messages and the merged notification can include multiple AMDR messages combined into one notification.

FIGS. 11A and 11B show data source definitions and a corresponding DAG in accordance with some implementations. As shown in FIG. 11B, join results t4 and t5 share a common merged join listener MJL_1. In operation, the system can, in some embodiments, determine that two join results share the same ancestors and in such cases generate the DAG such that those two join results share a single shared merge join listener. In some embodiments, two merged notification listeners can be used as shown, for example, in FIG. 11C.

FIG. 11C shows a DAG corresponding to the data source definitions shown in FIG. 11A in accordance with some implementations. The DAG in FIG. 11C includes two separate merged join listeners MJL_1 and MJL_2 for join results t4 and t5, respectively, which share the same ancestors.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), a field programmable gate array (FPGA) or the like. The instructions can be compiled from source code instructions provided in accordance with a programming language such as Java, C, C++, C #.net, assembly or the like. The instructions can also comprise code and data objects provided in accordance with, for example, the Visual Basic™ language, a specialized database query language, or another structured, object-oriented or other programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a non-transitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for data source refreshing.

Application Ser. No. 15/154,974, entitled "DATA PARTITIONING AND ORDERING" and filed in the United States Patent and Trademark Office on May 14, 2016, is hereby incorporated by reference herein in its entirety as if fully set forth herein.

Application Ser. No. 15/154,975, entitled "COMPUTER DATA SYSTEM DATA SOURCE REFRESHING USING AN UPDATE PROPAGATION GRAPH" and filed in the United States Patent and Trademark Office on May 14, 2016, is hereby incorporated by reference herein in its entirety as if fully set forth herein.

Application Ser. No. 15/154,979, entitled "COMPUTER DATA SYSTEM POSITION-INDEX MAPPING" and filed in the United States Patent and Trademark Office on May 14, 2016, is hereby incorporated by reference herein in its entirety as if fully set forth herein.

Application Ser. No. 15/154,980, entitled "SYSTEM PERFORMANCE LOGGING OF COMPLEX REMOTE QUERY PROCESSOR QUERY OPERATIONS" and filed in the United States Patent and Trademark Office on May 14, 2016, is hereby incorporated by reference herein in its entirety as if fully set forth herein.

Application Ser. No. 15/154,983, entitled "DISTRIBUTED AND OPTIMIZED GARBAGE COLLECTION OF REMOTE AND EXPORTED TABLE HANDLE LINKS TO UPDATE PROPAGATION GRAPH NODES" and filed in the United States Patent and Trademark Office on May 14, 2016, is hereby incorporated by reference herein in its entirety as if fully set forth herein.

Application Ser. No. 15/154,984, entitled "COMPUTER DATA SYSTEM CURRENT ROW POSITION QUERY LANGUAGE CONSTRUCT AND ARRAY PROCESSING QUERY LANGUAGE CONSTRUCTS" and filed in the United States Patent and Trademark Office on May 14, 2016, is hereby incorporated by reference herein in its entirety as if fully set forth herein.

Application Ser. No. 15/154,985, entitled "PARSING AND COMPILING DATA SYSTEM QUERIES" and filed in the United States Patent and Trademark Office on May 14, 2016, is hereby incorporated by reference herein in its entirety as if fully set forth herein.

Application Ser. No. 15/154,987, entitled "DYNAMIC FILTER PROCESSING" and filed in the United States Patent and Trademark Office on May 14, 2016, is hereby incorporated by reference herein in its entirety as if fully set forth herein.

Application Ser. No. 15/154,988, entitled "DYNAMIC JOIN PROCESSING USING REAL-TIME MERGED NOTIFICATION LISTENER" and filed in the United States Patent and Trademark Office on May 14, 2016, is hereby incorporated by reference herein in its entirety as if fully set forth herein.

Application Ser. No. 15/154,990, entitled "DYNAMIC TABLE INDEX MAPPING" and filed in the United States Patent and Trademark Office on May 14, 2016, is hereby incorporated by reference herein in its entirety as if fully set forth herein.

Application Ser. No. 15/154,991, entitled "QUERY TASK PROCESSING BASED ON MEMORY ALLOCATION AND PERFORMANCE CRITERIA" and filed in the United States Patent and Trademark Office on May 14, 2016, is hereby incorporated by reference herein in its entirety as if fully set forth herein.

Application Ser. No. 15/154,993, entitled "A MEMORY-EFFICIENT COMPUTER SYSTEM FOR DYNAMIC UPDATING OF JOIN PROCESSING" and filed in the United States Patent and Trademark Office on May 14, 2016, is hereby incorporated by reference herein in its entirety as if fully set forth herein.

Application Ser. No. 15/154,995, entitled "QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/154,996, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/154,997, entitled "DYNAMIC UPDATING OF QUERY RESULT DISPLAYS" and filed in the United States Patent and Trademark Office on May 14, 2016, is hereby incorporated by reference herein in its entirety as if fully set forth herein.

Application Ser. No. 15/154,998, entitled "DYNAMIC CODE LOADING" and filed in the United States Patent and Trademark Office on May 14, 2016, is hereby incorporated by reference herein in its entirety as if fully set forth herein.

Application Ser. No. 15/154,999, entitled "IMPORTATION, PRESENTATION, AND PERSISTENT STORAGE OF DATA" and filed in the United States Patent and Trademark Office on May 14, 2016, is hereby incorporated by reference herein in its entirety as if fully set forth herein.

Application Ser. No. 15/155,001, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/155,005, entitled "PERSISTENT QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/155,006, entitled "SINGLE INPUT GRAPHICAL USER INTERFACE CONTROL ELEMENT AND METHOD" and filed in the United States Patent and Trademark Office on May 14, 2016, is hereby incorporated by reference herein in its entirety as if fully set forth herein.

Application Ser. No. 15/155,007, entitled "GRAPHICAL USER INTERFACE DISPLAY EFFECTS FOR A COMPUTER DISPLAY SCREEN" and filed in the United States Patent and Trademark Office on May 14, 2016, is hereby incorporated by reference herein in its entirety as if fully set forth herein.

Application Ser. No. 15/155,009, entitled "COMPUTER ASSISTED COMPLETION OF HYPERLINK COMMAND SEGMENTS" and filed in the United States Patent and Trademark Office on May 14, 2016, is hereby incorporated by reference herein in its entirety as if fully set forth herein.

Application Ser. No. 15/155,010, entitled "HISTORICAL DATA REPLAY UTILIZING A COMPUTER SYSTEM" and filed in the United States Patent and Trademark Office on May 14, 2016, is hereby incorporated by reference herein in its entirety as if fully set forth herein.

Application Ser. No. 15/155,011, entitled "DATA STORE ACCESS PERMISSION SYSTEM WITH INTERLEAVED APPLICATION OF DEFERRED ACCESS CONTROL FILTERS" and filed in the United States Patent and Trademark Office on May 14, 2016, is hereby incorporated by reference herein in its entirety as if fully set forth herein.

Application Ser. No. 15/155,012, entitled "REMOTE DATA OBJECT PUBLISHING/SUBSCRIBING SYSTEM HAVING A MULTICAST KEY-VALUE PROTOCOL" and filed in the United States Patent and Trademark Office on May 14, 2016, is hereby incorporated by reference herein in its entirety as if fully set forth herein.

Application Ser. No. 15/351,429, entitled "QUERY TASK PROCESSING BASED ON MEMORY ALLOCATION AND PERFORMANCE CRITERIA" and filed in the United States Patent and Trademark Office on Nov. 14, 2016, is hereby incorporated by reference herein in its entirety as if fully set forth herein.

Application Ser. No. 15/813,142, entitled "COMPUTER DATA SYSTEM DATA SOURCE HAVING AN UPDATE PROPAGATION GRAPH WITH FEEDBACK CYCLICALITY" and filed in the United States Patent and Trademark Office on Nov. 14, 2017, is hereby incorporated by reference herein in its entirety as if fully set forth herein.

Application Ser. No. 15/813,127, entitled "COMPUTER DATA DISTRIBUTION ARCHITECTURE CONNECTING AN UPDATE PROPAGATION GRAPH THROUGH MULTIPLE REMOTE QUERY PROCESSORS" and filed in the United States Patent and Trademark Office on Nov. 14, 2017, is hereby incorporated by reference herein in its entirety as if fully set forth herein.

Application Ser. No. 15/813,119, entitled "KEYED ROW SELECTION" and filed in the United States Patent and Trademark Office on Nov. 14, 2017, is hereby incorporated by reference herein in its entirety as if fully set forth herein.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A system for updating a data object using update propagation graphs and merged join listeners to determine consistent join update processing, the system comprising:

one or more hardware processors coupled to a nontransitory computer readable medium having stored thereon software instructions that, when executed by the one or more processors, cause the one or more processors to perform operations including:

adding a join result structure to an update propagation graph (UPG) as a child of a merged join listener, wherein the merged join listener is a child of a plurality of objects that are subject to a join operation;

propagating updates through the UPG;

combining update notifications from the plurality of objects into a merged notification;

wherein the combining includes:

for each current notification received at the merged join listener during a given update clock cycle:

determining whether a priority queue is empty;

determining whether the priority queue includes an existing notification from a merged notification listener for the given update clock cycle, the priority queue comprising a plurality of elements, each of the elements having an associated node of the UPG and an associated priority such that a first element with a first priority is served before a second element with a second priority, priority of each of the elements of the priority queue being determined based on an arrangement of nodes within the UPG, delivering the merged notification to a join result structure node;

receiving the merged notification at the join result structure node; and applying changes to update a result of the join operation based on the merged notification.

2. The system of claim 1, wherein the plurality of objects are tables.

3. The system of claim 2, wherein the join result structure is a table.

4. The system of claim 1, wherein the UPG is a directed acyclic graph (DAG).

5. The system of claim 1, wherein the plurality of objects consists of three or more objects.

6. The system of claim 1, wherein the operations further include adding a second join result structure to the UPG as a second child of the merged join listener.

7. The system of claim 6, wherein the operations further include receiving a second merged notification at the second join result structure's node of the UPG.

8. The system of claim 1, wherein the join result structure comprises a plurality of matrices.

9. The system of claim 1, wherein the join operation is an operation selected from a group consisting of an outer join, an inner join, and a cross join.

10. A method comprising:
- adding a join result structure to an update propagation graph (UPG) as a child of a merged join listener, wherein the merged join listener is a child of a plurality of objects that are subject to a join operation;
- propagating updates through the UPG;
- combining update notifications from the plurality of objects into a merged notification;
- wherein the combining includes:
  - for a current notification received at the merged join listener during a given update clock cycle:
    - determining whether a priority queue is empty;
    - determining whether the priority queue includes an existing notification from a merged notification listener for the given update clock cycle, the priority queue comprising a plurality of elements, each of the elements having an associated node of the UPG and an associated priority such that a first element with a first priority is served before a second element with a second priority, priority of each of the elements of the priority queue being determined based on an arrangement of nodes within the UPG,
- delivering the merged notification to a join result structure node;
- receiving the merged notification at the join result structure node; and
- applying changes to update a result of the join operation based on the merged notification.

11. The method of claim 10, wherein the plurality of objects consists of a plurality of tables.

12. The method of claim 10, wherein the UPG is a directed acyclic graph (DAG).

13. The method of claim 10, wherein the merged join listener combining update notifications from the plurality of objects for a given update clock cycle into a merged notification comprises:
- receiving a notification during the given update clock cycle;
- determining that the priority queue includes an existing notification from the merged notification listener for the given update clock cycle; and
- updating, responsive to the determining, the existing notification to include an additional notification based on the received notification.

14. The method of claim 10, wherein the merged join listener combining update notifications from the plurality of objects for a given update clock cycle into a merged notification comprises:
- receiving a notification during the given update clock cycle;
- determining that the priority queue does not include an existing notification from the merged notification listener for the given update clock cycle; and
- adding, responsive to the determining, a new notification from the merged notification listener to the priority queue based on the received notification.

15. The method of claim 14, wherein the merged join listener combining update notifications from the plurality of objects for a given update clock cycle into a merged notification further comprises:
- receiving a second notification during the given update clock cycle;
- determining that the priority queue includes an existing notification from the merged notification listener for the given update clock cycle, the existing notification being the new notification; and
- updating, responsive to the determining, the existing notification to include an additional notification based on the second notification.

16. The method of claim 10, further comprising adding a second join result structure to the UPG as a second child of the merged join listener.

17. The method of claim 16, further comprising receiving a second merged notification at the second join result structure's node of the UPG.

18. The method of claim 17 wherein the second merged notification is a copy of the merged notification.

19. The method of claim 10, wherein the join result structure comprises a plurality of matrices.

20. The method of claim 10, wherein the join operation is an operation selected from a group consisting of an outer join, an inner join, and a cross join.

21. A nontransitory computer readable medium having stored thereon software instructions that, when executed by one or more processors, cause the one or more processors to perform operations including:
- adding a join result structure to an update propagation graph (UPG) as a child of a merged join listener, wherein the merged join listener is a child of a plurality of objects that are subject to a join operation;
- propagating updates through the UPG;
- combining update notifications from the plurality of objects into a merged notification;
- wherein the combining includes:
  - for a notification received at the merged join listener during a given update clock cycle:
    - determining whether a priority queue is empty;
    - determining whether the priority queue includes an existing notification from a merged notification listener for the given update clock cycle, the priority queue comprising a plurality of elements, each of the elements having an associated node of the UPG and an associated priority such that a first element with a first priority is served before a second element with a second priority, priority of each of the elements of the priority queue being determined based on an arrangement of nodes within the UPG,
- delivering the merged notification to a join result structure node;
- receiving the merged notification at the join result structure node; and
- applying changes to update a result of the join operation based on the merged notification.

22. The nontransitory computer readable medium of claim 21, wherein the plurality of objects are tables and the join result structure is a table.

23. The nontransitory computer readable medium of claim 21, wherein the UPG is a directed acyclic graph (DAG).

24. The nontransitory computer readable medium of claim 21, wherein the plurality of objects consists of three or more objects.

25. The nontransitory computer readable medium of claim 21, wherein the operations further include adding a second join result structure to the UPG as a second child of the merged join listener.

26. The nontransitory computer readable medium of claim 21, wherein the join result structure comprises a plurality of matrices.

27. The nontransitory computer readable medium of claim 21, wherein the join operation is an operation selected from a group consisting of an outer join, an inner join, and a cross join.

* * * * *